(12) United States Patent
Tatematsu et al.

(10) Patent No.: US 7,896,116 B2
(45) Date of Patent: Mar. 1, 2011

(54) DRIVE DEVICE OF HYBRID VEHICLE

(75) Inventors: Kazutaka Tatematsu, Nagoya (JP);
Ryoji Mizutani, Nishikamo-gun (JP);
Yasuhiro Endo, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 430 days.

(21) Appl. No.: 12/160,286

(22) PCT Filed: Feb. 6, 2007

(86) PCT No.: PCT/JP2007/052449

§ 371 (c)(1),
(2), (4) Date: Jul. 8, 2008

(87) PCT Pub. No.: WO2007/091705

PCT Pub. Date: Aug. 16, 2007

(65) Prior Publication Data

US 2009/0014222 A1   Jan. 15, 2009

(30) Foreign Application Priority Data

Feb. 8, 2006   (JP) .............................. 2006-031378

(51) Int. Cl.
*B60K 6/405* (2007.10)
(52) U.S. Cl. .................... 180/65.6; 180/65.21; 903/952
(58) Field of Classification Search ............. 180/65.21, 180/65.6, 65.8; 903/951, 952; 310/66, 68 R
See application file for complete search history.

(56) References Cited

U.S. PATENT DOCUMENTS

| | | | | |
|---|---|---|---|---|
| 6,166,498 A | * | 12/2000 | Yamaguchi et al. | 318/34 |
| 7,059,443 B2 | * | 6/2006 | Kira | 180/243 |
| 7,211,912 B2 | * | 5/2007 | Takenaka et al. | 310/54 |
| 7,406,939 B2 | | 8/2008 | Asahara et al. | |
| 7,621,359 B2 | | 11/2009 | Kano et al. | |
| 7,722,498 B2 | | 5/2010 | Kawasaki et al. | |
| 2003/0034186 A1 | | 2/2003 | Morita et al. | |
| 2003/0200761 A1 | | 10/2003 | Funahashi et al. | |
| 2004/0165868 A1 | | 8/2004 | Sato et al. | |

(Continued)

FOREIGN PATENT DOCUMENTS

JP    08-336226 A    12/1996

(Continued)

*Primary Examiner*—J. Allen Shriver, II
*Assistant Examiner*—John D Walters
(74) *Attorney, Agent, or Firm*—Sughrue Mion, PLLC

(57) ABSTRACT

A drive device of a hybrid vehicle includes a motor generator and a motor generator arranged at the back of the motor generator, each rotor having a rotational center axis arranged on the same axis, a power split mechanism arranged on the same axis as a rotational center axis of a crankshaft and between the crankshaft and the motor generator, and a power control unit performing control of the motor generator. The power control unit includes a reactor arranged in a gap portion formed on one side with respect to the rotational center axis of the motor generator and between a lower side surface of the power element substrate, an outer circumferential side surface of the motor generator and an inner side surface of a case, and a capacitor arranged on the other side with respect to the rotational center axis of the motor generator.

14 Claims, 15 Drawing Sheets

U.S. PATENT DOCUMENTS

| | | |
|---|---|---|
| 2004/0226761 A1 | 11/2004 | Takenaka et al. |
| 2005/0037883 A1 | 2/2005 | Motoike et al. |
| 2005/0038576 A1 | 2/2005 | Hara et al. |
| 2006/0064998 A1 | 3/2006 | Funahashi et al. |
| 2006/0224360 A1 | 10/2006 | Kishimoto |
| 2007/0246635 A1 | 10/2007 | Nakajima et al. |
| 2007/0272455 A1 | 11/2007 | Lang et al. |
| 2008/0258569 A1 | 10/2008 | Kano et al. |
| 2009/0014222 A1 | 1/2009 | Tatematsu et al. |
| 2009/0030568 A1 | 1/2009 | Amano et al. |
| 2009/0054190 A1 | 2/2009 | Kim et al. |
| 2009/0114462 A1 | 5/2009 | Tahara et al. |
| 2009/0250271 A1 | 10/2009 | Komatsu et al. |

FOREIGN PATENT DOCUMENTS

| | | |
|---|---|---|
| JP | 2001-119961 A | 4/2001 |
| JP | 2003-102111 A | 4/2003 |
| JP | 2004-343845 A | 12/2004 |
| JP | 2005-032830 A | 2/2005 |
| JP | 2005-057928 A | 3/2005 |
| JP | 2005-073392 A | 3/2005 |
| JP | 2007-103196 A | 4/2007 |

* cited by examiner

DRIVE DEVICE OF HYBRID VEHICLE

TECHNICAL FIELD

The present invention relates to a drive device of a hybrid vehicle, and particularly to a drive device of a hybrid vehicle having an inverter and a motor accommodated in one case.

BACKGROUND ART

Most of existing hybrid automobiles have a configuration in which a big, box-shaped case for an inverter is fixed to a chassis, under which a motor case (trans axle) is arranged. Considering a drive device of a hybrid vehicle that can be mounted on as many vehicle types as possible, the configuration with two cases makes it difficult to share components, since their arrangement is to be optimized for each vehicle type.

Essentially, it is desirable to store and integrate units required to be combined for operation, in one case. Japanese Patent Laying-Open No. 2004-343845 and Japanese Patent Laying-Open No. 2001-119961 disclose a drive device of a hybrid vehicle in which a motor and an inverter are integrated.

However, the drive device of a hybrid vehicle disclosed in Japanese Patent Laying-Open No. 2004-343845 and Japanese Patent Laying-Open No. 2001-119961 has such a structure in that an inverter is merely placed on a motor, and there is room for improvement in the position of center of gravity of the vehicle as for the height direction when the drive device is mounted on the vehicle. Moreover, no consideration is given to space saving in the space where the drive device of a hybrid vehicle is mounted.

In order to enable mounting on many vehicle types, it is desired that an inverter and a motor can be arranged in an outline approximately equivalent to that of an automatic transmission arranged adjacent to an engine in a usual vehicle.

As discussed above, in a drive device of a hybrid vehicle, size reduction and space saving are requested. On the other hand, in order to keep motor current small while avoiding a voltage increase of a battery, such a configuration is considered in that a battery voltage increased by a boost converter is supplied to an inverter driving a motor.

However, in consideration of a drive device of a hybrid vehicle including the integrated motor and inverter as well as an integrated boost converter, a reactor included in the boost converter is a relatively large component and thus may be a factor that hinders size reduction and space saving of the drive device.

An object of the present invention is to provide a drive device of a hybrid vehicle which is reduced in size and integrated with an inverter.

DISCLOSURE OF THE INVENTION

In accordance with an aspect of the present invention, a drive device of a hybrid vehicle includes: a damper having a crankshaft of an internal combustion engine coupled thereto; an electric rotating machine having its rotational shaft arranged to overlap with a rotational shaft of the damper; a power transmission mechanism combining motive power generated by the internal combustion engine with motive power generated by the electric rotating machine for transmission to a drive shaft; a power control unit performing control of the electric rotating machine; and a case accommodating the damper, the electric rotating machine, the power transmission mechanism and the power control unit. The power control unit includes a circuit substrate having a power element of at least one of an inverter and a voltage converter mounted thereon, and a reactor arranged, if being projected from the rotational shaft direction, in a gap portion formed inside a horizontal dimension of a projection portion of that part of the case which accommodates the damper, the electric rotating machine, the power split mechanism, and the circuit substrate at a time of being mounted on a vehicle.

In accordance with another aspect of the present invention, a drive device of a hybrid vehicle includes: an electric rotating machine; a power control unit performing control of the electric rotating machine; and a case accommodating the electric rotating machine and the power control unit. The power control unit includes a circuit substrate having a power element of at least one of an inverter and a voltage converter mounted thereon and being arranged above the electric rotating machine at a time of being mounted on a vehicle, and a reactor arranged, if being projected from the rotational shaft direction, in a gap portion formed inside a vertical dimension of a projection portion of that part of the case which accommodates the electric rotating machine and the circuit substrate at a time of being mounted on a vehicle, the gap portion having an outline including a lower side surface of the circuit substrate, an outer circumferential side surface of the electric rotating machine and an inner side surface of the case.

Preferably, the gap portion includes a first gap portion formed on one side with respect to a rotational center axis of the electric rotating machine and a second gap portion formed on the other side with respect to the rotational center axis of the electric rotating machine. The reactor is arranged in the first gap portion.

Preferably, the reactor includes a core having a shape similar to the first gap portion and a coil wound around the core.

Preferably, the reactor includes a core branching off from a stator core of the electric rotating machine to be disposed in the first gap portion and a coil wound around the core.

Preferably, the power control unit further includes a capacitor placed between the power element and the inverter to smooth voltage-converted direct-current voltage for input to the inverter. The capacitor is arranged in the second gap portion.

More preferably, the capacitor is a film capacitor formed of a shape similar to the second gap portion.

Preferably, the drive device of a hybrid vehicle further includes a power cable connecting the voltage converter to a power supply. The power cable includes a magnetic material core serving as a core of the power cable and a conductive line spirally wrapped around the magnetic material core.

Preferably, the drive device of a hybrid vehicle further includes first and second power cables connecting the voltage converter to a power supply. Each of the first and second power cables includes a magnetic material core serving as a core of the cable and a conductive line spirally wrapped around the magnetic material core. The magnetic material core of the first power cable and the magnetic material core of the second power cable have respective one ends connected to each other and the respective other ends connected to each other to form an annular magnetic path.

Preferably, the drive device of a hybrid vehicle further includes a connection member attached to an exterior of the case for electrically connecting the voltage converter and the power cable. The connection member includes a conductive line disposed between one terminal and the other terminal, and a magnetic material core spirally wrapped with the conductive line.

In accordance with the present invention, it becomes possible to realize a drive device of a hybrid vehicle which is integrated with an inverter and reduced in size.

BEST MODES FOR CARRYING OUT THE INVENTION

Figure 1:
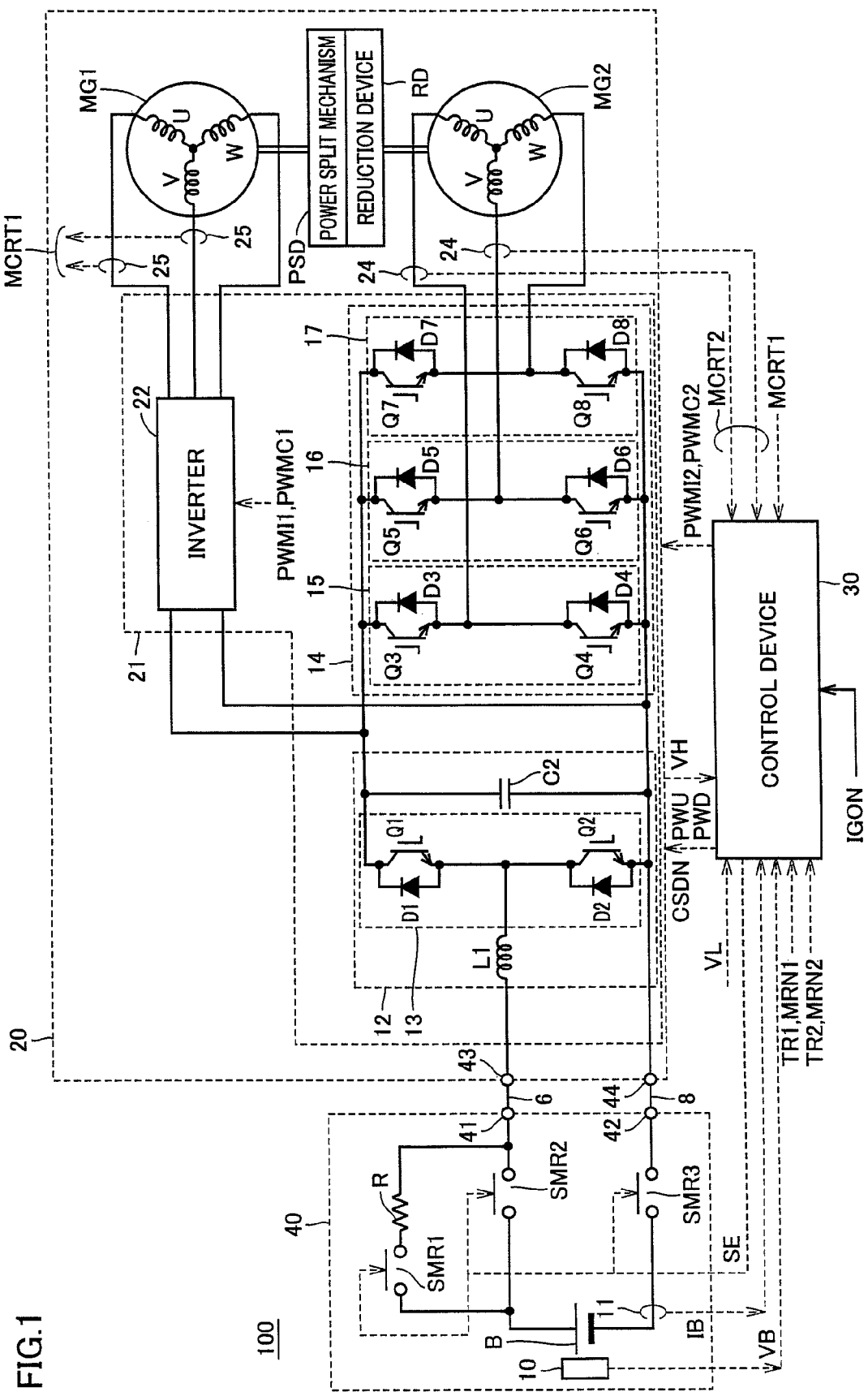
FIG. 1 is a circuit diagram showing a configuration concerning motor generator control of a hybrid vehicle in accordance with a first embodiment of the present invention.

In the following, embodiments of the present invention will be described in detail with reference to the figures. It is noted that in the figures the same or corresponding parts will be denoted with the same reference characters and description thereof will not be repeated.

First Embodiment

FIG. 1 is a circuit diagram showing a configuration concerning motor generator control of a hybrid vehicle 100 in accordance with a first embodiment of the present invention.

Referring to FIG. 1, vehicle 100 includes a battery unit 40, a drive device 20, a control device 30, and an engine and a wheel not shown.

Drive device 20 includes motor generators MG1, MG2, a power split mechanism PSD, a reduction device RD, and a power control unit 21 performing control of motor generators MG1, MG2.

Power split mechanism PSD is basically a mechanism coupled to the engine and motor generators MG1, MG2 for splitting motive power between them. For example, as a power split mechanism, a planetary gear train having three rotational shafts of a sun gear, a planetary carrier and a ring gear can be used.

Two rotational shafts of power split mechanism PSD are respectively connected to the rotational shafts of the engine and motor generator MG1, and the other one rotational shaft is connected to reduction device RD. The rotation of motor generator MG2 is reduced by reduction device RD integrated with power split mechanism PSD and is transmitted to power split mechanism PSD.

It is noted that the rotational shaft of the reduction device is coupled to the wheel by a not-shown reduction gear or a not-shown differential gear as described later.

Terminal 41, 42 are provided to battery unit 40. In addition, terminals 43, 44 are provided to drive device 20. Vehicle 100 further includes a power cable 6 connecting terminal 41 and terminal 43, and a power cable 8 connecting terminal 42 and terminal 44.

Battery unit 40 includes a battery B, a system main relay SMR3 connected between a negative pole of battery B and terminal 42, a system main relay SMR2 connected between a positive pole of battery B and terminal 41, and a system main relay SMR1 and a limiting resistor R connected in series between the positive pole of battery B and terminal 41. The conducting/non-conducting state of system main relays SMR1-SMR3 is controlled in response to a control signal SE applied from control device 30.

Battery unit 40 further includes a voltage sensor 10 measuring voltage VB between the terminals of battery B, and a current sensor 11 sensing current IB flowing in battery B.

As battery B, a secondary battery such as a nickel metal hydride or lithium ion battery or a fuel cell may be used. Furthermore, as an electricity storage battery in place of battery B, a large-capacitance capacitor such as an electric double layer capacitor may be used.

Power control unit 21 includes inverters 22, 14 provided respectively corresponding to motor generators MG1, MG2, and a boost converter 12 provided in common to inverters 22, 14.

Boost converter 12 boosts voltage between terminals 43 and 44. Inverter 14 converts direct-current voltage applied from boost converter 12 into three-phase alternating current for output to motor generator MG2.

Boost converter 12 includes a reactor L1 having one end connected to terminal 43, IGBT elements Q1, Q2 connected in series between the output terminals of boost converter 12 outputting boosted voltage VH, diodes D1, D2 connected in parallel to IGBT elements Q1, Q2, respectively, and a smoothing capacitor C2. Smoothing capacitor C2 smoothes the voltage boosted by boost converter 12.

The other end of reactor L1 is connected to the emitter of IGBT element Q1 and the collector of IGBT element Q2. The cathode of diode D1 is connected to the collector of IGBT element Q1, and the anode of diode D1 is connected to the emitter of IGBT element Q1. The cathode of diode D2 is connected to the collector of IGBT element Q2, and the anode of diode D2 is connected to the emitter of IGBT element Q2.

Inverter 14 converts direct-current voltage output by boost converter 12 into three-phase alternating current for output to motor generator MG2 which drives the wheels. In addition, inverter 14 returns the electric power generated in motor generator MG2 to boost converter 12, according to regenerative braking. Here, boost converter 12 is controlled by control device 30 so that it operates as a down-converter.

Inverter 14 includes a U-phase arm 15, a V-phase arm 16 and a W-phase arm 17. U-phase arm 15, V-phase arm 16 and W-phase arm 17 are connected in parallel between the output lines of boost converter 12.

U-phase arm 15 includes IGBT elements Q3, Q4 connected in series, and diodes D3, D4 connected in parallel with IGBT elements Q3, Q4, respectively. The cathode of diode D3 is connected to the collector of IGBT element Q3, and the anode of diode D3 is connected to the emitter of IGBT element Q3. The cathode of diode D4 is connected to the collector of IGBT element Q4, and the anode of diode D4 is connected to the emitter of IGBT element Q4.

V-phase arm 16 includes IGBT elements Q5, Q6 connected in series, and diodes D5, D6 connected in parallel with IGBT elements Q5, Q6, respectively. The cathode of diode D5 is connected to the collector of IGBT element Q5, and the anode of diode D5 is connected to the emitter of IGBT element Q5. The cathode of diode D6 is connected to the collector of IGBT element Q6, and the anode of diode D6 is connected to the emitter of IGBT element Q6.

W-phase arm 17 includes IGBT elements Q7, Q8 connected in series, and diodes D7, D8 connected in parallel with IGBT elements Q7, Q8, respectively. The cathode of diode D7 is connected to the collector of IGBT element Q7, and the anode of diode D7 is connected to the emitter of IGBT element Q7. The cathode of diode D8 is connected to the collector of IGBT element Q8, and the anode of diode D8 is connected to the emitter of IGBT element Q8.

An intermediate point of each phase arm is connected to each phase end of each phase coil of motor generator MG2. In other words, motor generator MG2 is a three-phase permanent-magnet synchronous motor, and each of three coils of U, V, W phases has one end connected to a neutral point in common. Then, the other end of the U-phase coil is connected to a connection node of IGBT elements Q3, Q4. The other end of the V-phase coil is connected to a connection node of IGBT elements Q5, Q6. The other end of the W-phase coil is connected to a connection node of IGBT elements Q7, Q8.

Current sensor 24 detects current flowing in motor generator MG2 as a motor current value MCRT2 and outputs motor current value MCRT2 to control device 30.

Inverter 22 is connected to boost converter 12 in parallel with inverter 14. Inverter 22 converts direct-current voltage output by boost converter 12 into three-phase alternating current for output to motor generator MG1. Inverter 22 receives the increased voltage from boost converter 12 to drive motor generator MG1, for example, for starting the engine.

In addition, inverter 22 returns electric power generated in motor generator MG1 by a rotational torque transmitted from a crankshaft of the engine to boost converter 12. Here, boost converter 12 is controlled by control device 30 so that it operates as a down-converter.

The internal configuration of inverter 22 is similar to that of inverter 14, although not shown, and the detailed description will not be repeated.

Control device 30 receives torque command values TR1, TR2, motor rotational speeds MRN1, MRN2, the respective values of voltages VB, VL, VH and current IB, motor current values MCRT1, MCRT2, and a start signal IGON.

Here, torque command value TR1, motor rotational speed MRN1 and motor current value MCRT1 are related to motor generator MG1, and torque command value TR2, motor rotational speed MRN2 and motor current value MCRT2 are related to motor generator MG2.

Furthermore, voltage VB is a voltage of battery B, and current IB is current flowing in battery B. Voltage VL is a voltage that has not been converted by boost converter 12, and voltage VH is a voltage that has been converted by boost converter 12.

Then, control device 30 outputs a control signal PWU giving an up-convert instruction and a control signal PWD giving a down-convert instruction to boost converter 12, and a signal CSDN indicating an operation prohibition.

In addition, control device 30 outputs to inverter 14 a drive instruction PWMI2 for converting direct-current voltage which is an output of boost converter 12 into alternating-current voltage for driving motor generator MG2 and a regenerative instruction PWMC2 for converting alternating-current voltage generated in motor generator MG2 into direct-current voltage and returning the voltage to boost converter 12.

Similarly, control device 30 outputs to inverter 22 a drive instruction PWMI1 for converting direct-current voltage into alternating-current voltage for driving motor generator MG1 and a regenerative instruction PWMC1 for converting alternating-current voltage generated in motor generator MG1 into direct-current voltage and returning the voltage to boost converter 12.

Figure 2:
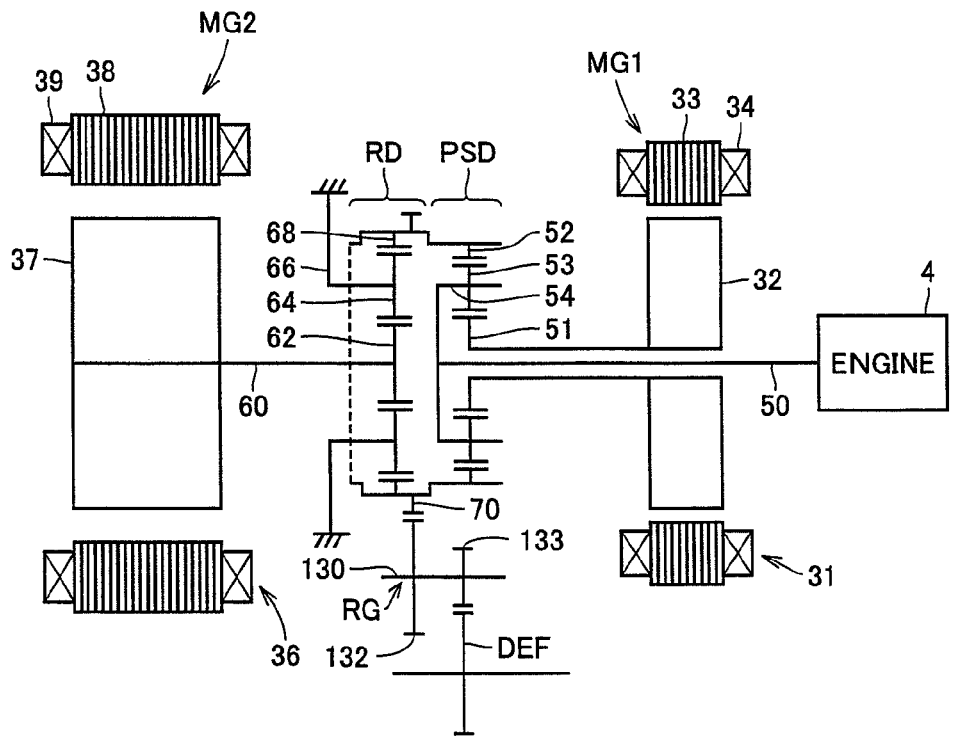
FIG. 2 is a schematic diagram illustrating details of a power split mechanism and a speed reducer in FIG. 1.

FIG. 2 is a schematic diagram illustrating the details of power split mechanism PSD and reduction device RD in FIG. 1.

Referring to FIG. 2, this vehicle drive device includes motor generator MG2, reduction device RD connected to the rotational shaft of motor generator MG2, an axle rotating according to rotation of the rotational shaft decelerated by reduction device RD, an engine 4, motor generator MG1, and power split mechanism PSD performing power split between reduction device RD, engine 4 and motor generator MG1. A reduction ratio of reduction device RD from motor generator MG2 to power split mechanism PSD is, for example, twice or more.

A crankshaft 50 of engine 4, a rotor 32 of motor generator MG1 and a rotor 37 of motor generator MG2 rotate around the same axis.

Power split mechanism PSD is a planetary gear in the example shown in FIG. 2 and includes a sun gear 51 coupled to a hollow sun gear shaft having a shaft center through which crankshaft 50 passes, a ring gear 52 supported rotatably on the same axis as crankshaft 50, a pinion gear 53 arranged between sun gear 51 and ring gear 52 and revolving around the outer circumference of sun gear 51 while rotating on its own axis, and a planetary carrier 54 coupled to an end portion of crankshaft 50 and supporting the rotational shaft of each pinion gear 53.

In power split mechanism PSD, three shafts, namely, the sun gear shaft coupled to sun gear 51, a ring gear case coupled to ring gear 52, and crankshaft 50 coupled to planetary carrier 54 are provided as motive power input/output shafts. Then, when a motive power input/output to any two of these three shafts is determined, a motive power input/output to the remaining one shaft is defined based on the motive power input/output to the other two shafts.

A counter drive gear 70 for taking out motive power is provided on the outside of the ring gear case and rotates integrally with ring gear 52. Counter drive gear 70 is connected to a transmission reduction gear RG. Then, motive power is transmitted between counter drive gear 70 and transmission reduction gear RG. Transmission reduction gear RG drives a differential gear DEF. Furthermore, on a downhill and the like, rotation of wheels is transmitted to differential gear DEF, and transmission reduction gear RG is driven by differential gear DEF.

Motor generator MG1 includes a stator 31 forming a rotating magnetic field, and rotor 32 arranged in the interior of stator 31 and having a plurality of permanent magnets embedded therein. Stator 31 includes a stator core 33 and a three-phase coil 34 wound around stator core 33. Rotor 32 is coupled to the sun gear shaft rotating integrally with sun gear 51 of power split mechanism PSD. Stator core 33 is formed by stacking thin, electromagnetic steel plates and is fixed to a not-shown case.

Motor generator MG1 operates as an electric motor which rotationally drives rotor 32 by an interaction between a magnetic field by the permanent magnet embedded in rotor 32 and a magnetic field formed by three-phase coil 34. Motor generator MG1 also operates as a power generator which produces electromotive force at the opposite ends of three-phase coil 34 by an interaction between the magnetic field by the permanent magnet and rotation of rotor 32.

Motor generator MG2 includes a stator 36 forming a rotating magnetic field, and rotor 37 arranged in the interior of stator 36 and having a plurality of permanent magnets embedded therein. Stator 36 includes a stator core 38 and a three-phase coil 39 wound around stator core 38.

Rotor 37 is coupled to the ring gear case rotating integrally with ring gear 52 of power split mechanism PSD by reduction device RD. Stator core 38 is formed by, for example, stacking thin, electromagnetic steel plates and is fixed to a not-shown case.

Motor generator MG2 also operates as a power generator which produces electromotive force at the opposite ends of three-phase coil 39 by an interaction between the magnetic field by the permanent magnet and rotation of rotor 37. In addition, motor generator MG2 operates as an electric motor which rotationally drives rotor 37 by an interaction between the magnetic field by the permanent magnet and a magnetic field formed by three-phase coil 39.

Reduction device RD performs deceleration using such a structure in that a planetary carrier 66 which is one of rotating elements of the planetary gear is fixed to the case of the vehicle drive device. In other words, reduction device RD includes a sun gear 62 coupled to the shaft of rotor 37, a ring gear 68 rotating integrally with ring gear 52, and a pinion gear 64 meshing with ring gear 68 and sun gear 62 to transmit rotation of sun gear 62 to ring gear 68.

For example, the reduction ratio can be increased to twice or more by setting the number of teeth of ring gear 68 to twice or more the number of teeth of sun gear 62.

Figure 3:
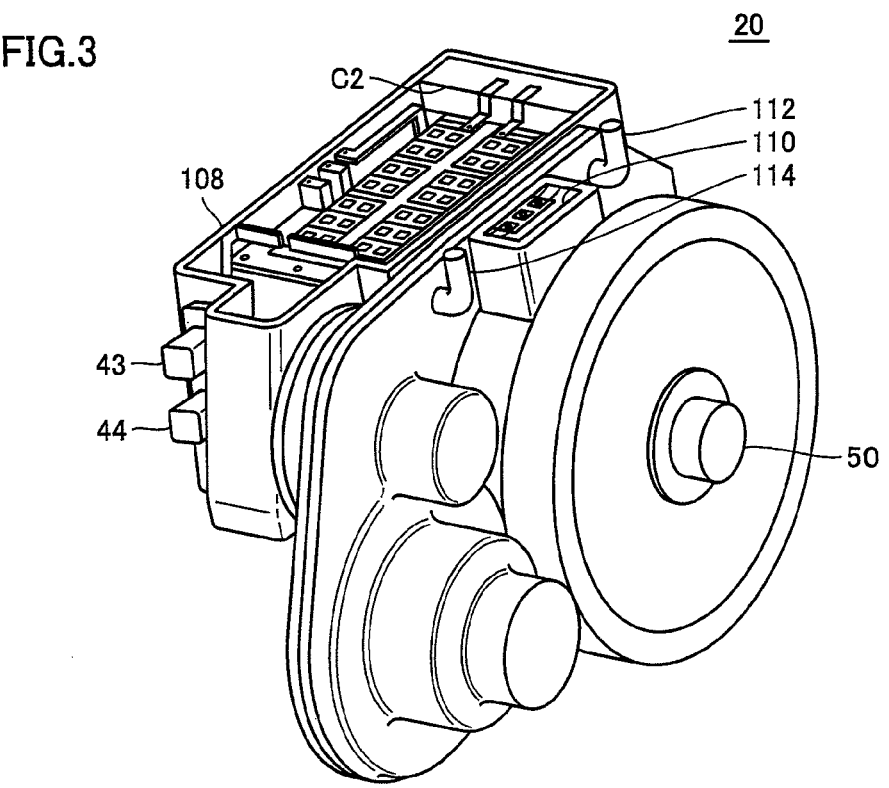
FIG. 3 is an external perspective view showing a drive device of a hybrid vehicle in accordance with the first embodiment of the present invention.

FIG. 3 is an external perspective view of drive device 20 of a hybrid vehicle in accordance with the first embodiment of the present invention.

Figure 4:
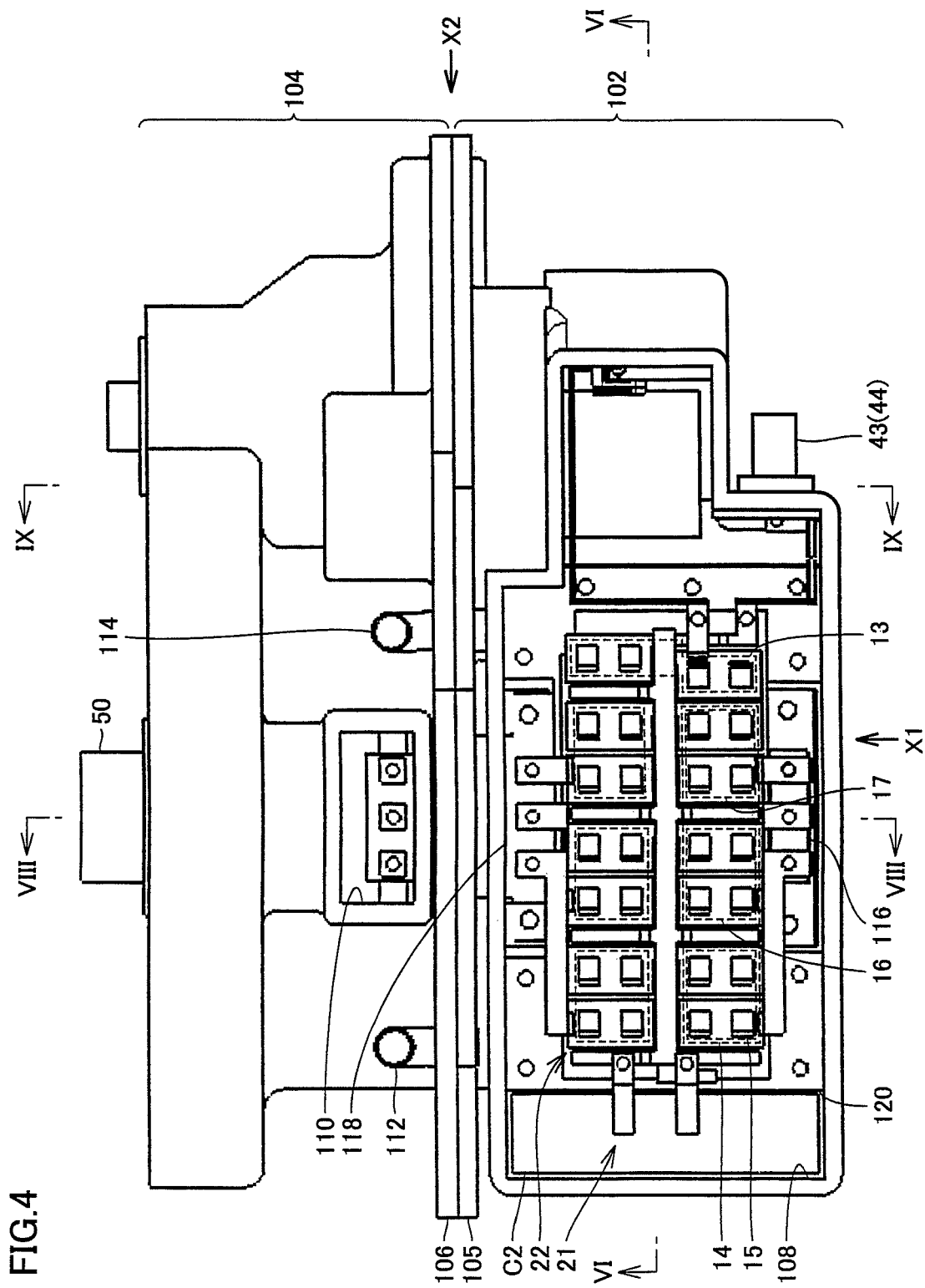
FIG. 4 is a plan view of the drive device.

FIG. 4 is a plan view of drive device 20.

Referring to FIG. 3, FIG. 4, the case of drive device 20 is configured in such a manner that it can be divided into a case 104 and a case 102. Case 104 is a part mainly accommodating motor generator MG1, and case 102 is a part mainly accommodating motor generator MG2 and power control unit 21.

A flange 106 is formed at case 104, a flange 105 is formed at case 102, and case 104 and case 102 are integrated by fixing flange 106 and flange 105 to each other by a bolt or the like.

Case 102 is provided with an opening portion 108 for installing power control unit 21. Inside this opening portion 108, capacitor C2, a power element substrate 120 and terminal bases 116, 118 are accommodated. Capacitor C2 is accommodated in the interior left-side portion (the vehicle travel direction side) of opening portion 108.

Furthermore, although not shown, reactor L1 is accommodated in the right-side portion below power element substrate 120 (corresponding to the back side of the sheet). It is noted that this opening portion 108 is closed by a cover in a vehicle-mounted state. Alternatively, places may be changed in such a manner that capacitor C2 is accommodated in the interior right-side portion of opening portion 108 and reactor L1 is accommodated in the left-side portion below power element substrate 120.

In other words, reactor L1 is arranged on one side of the rotational shaft of motor generators MG1 and MG2, and capacitor C2 is arranged on the other side of the rotational shaft. Then, power element substrate 120 is arranged in a region adjacent to capacitor C2 above motor generator MG2.

In such an arrangement structure, the present invention is further characterized in that reactor L1 is arranged in a gap portion which is formed on one side of the rotational shaft of motor generators MG1 and MG2 and is surrounded with a lower side surface of power element substrate 120, an outer circumferential side surface of motor generator MG2 and an inner side surface of case 102.

This gap portion corresponds to a part of an empty space inevitably formed in the interior of the case because of integration of the motor and the inverter. The present invention realizes size reduction and space saving of the drive device of a hybrid vehicle by effectively using this empty space to arrange reactor L1 which occupies a relatively large space. The detailed arrangement structure of reactor L1 will be detailed later.

Inverter 22 controlling motor generator MG1, inverter 14 controlling motor generator MG2, and an arm portion 13 of boost converter 12 are mounted on power element substrate 120.

In a region between inverter 14 and inverter 22, bus bars for power supply arranged to be stacked in the vertical direction are provided. One bus bar from each of U-phase arm 15, V-phase arm 16 and W-phase arm 17 of inverter 14 is provided to be directed to terminal base 116 connected to the stator coil of motor generator MG2. Similarly, three bus bars from inverter 22 are also provided to be directed to terminal base 118 connected to the stator coil of motor generator MG1.

A water passage is provided under power element substrate 120 in order to cool power element substrate 120 which reaches a high temperature. A cooling water inlet 114 to the water passage and a cooling water outlet 112 are provided to case 102. Here, these inlet and outlet are formed by screwing union nuts or the like through flange portions 106, 105 into case 102.

Voltage applied from battery unit 40 in FIG. 1 to terminals 43, 44 through power cables 6, 8 is boosted by boost converter 12 including reactor L1 and arm portion 13, smoothed by capacitor C2, and then supplied to inverters 14 and 22.

In this manner, the battery voltage is boosted using boost converter 12, so that the battery voltage can be reduced to about 200 V while the motor generator can be driven at a high voltage exceeding 500V, thereby preventing electricity loss because of power supply with small current and realizing a high power output of the motor.

In a case where boost converter 12 is included and integrated, in addition to inverters 14, 22 and motor generators MG1, MG2, as drive device 20, the arrangement place for reactor L1 and capacitor C2 which are relatively large components becomes a problem.

Figure 5:
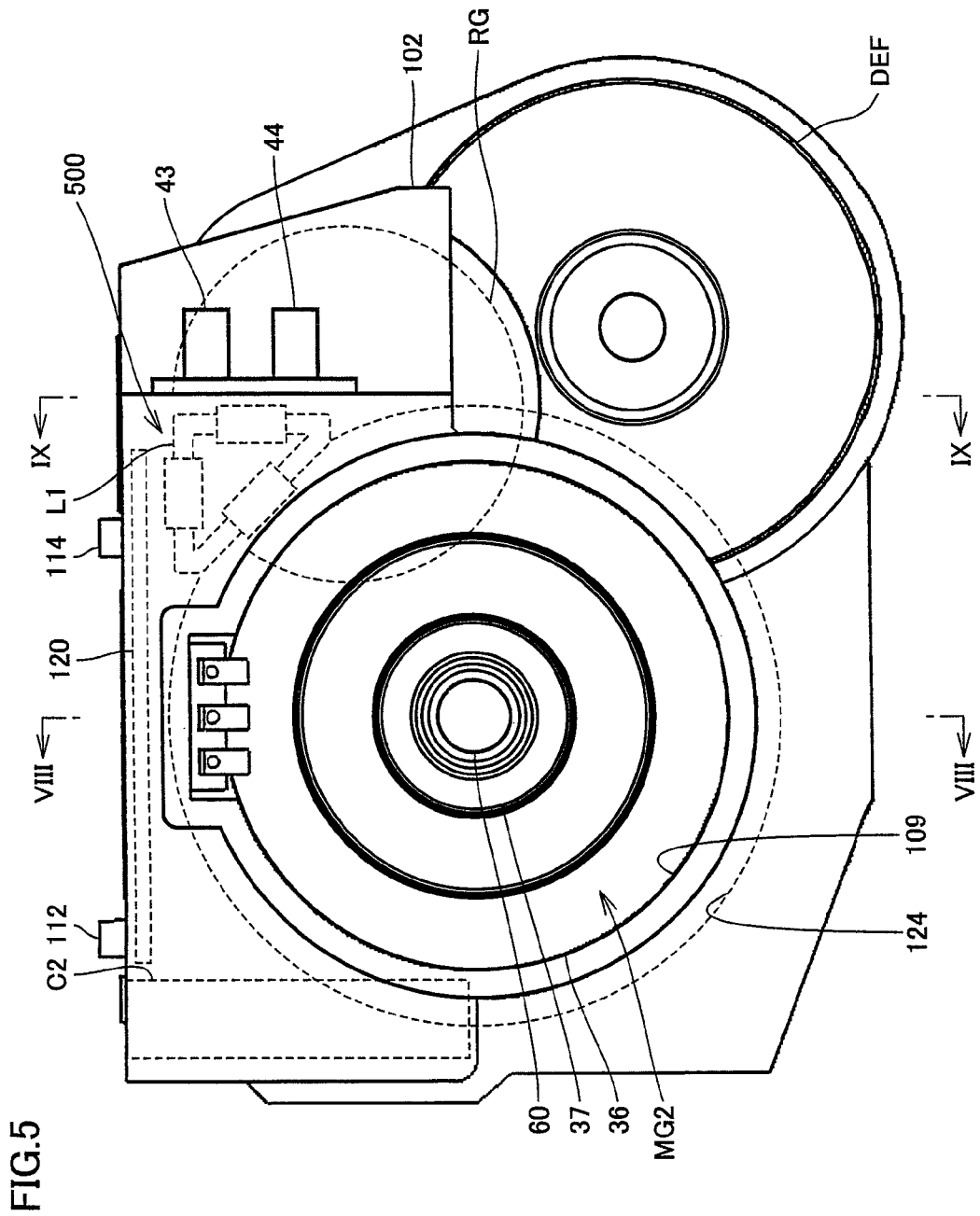
FIG. 5 is a side view of the drive device as viewed from X1 direction in FIG. 4.

FIG. 5 is a side view of drive device 20 as viewed from X1 direction in FIG. 4.

Referring to FIG. 5, case 102 is provided with an opening portion 109 for installation and maintenance of the motor generator. This opening portion 109 is closed by a cover in a vehicle-mounted state.

Inside opening portion 109, motor generator MG2 is arranged. Rotor 37 is arranged in the interior of stator 36 to which the bus bars of U, V, W phases are connected. In the center portion of rotor 37, a hollow shaft 60 is seen.

As shown in FIG. 5, since stator 36 of motor generator MG2 extends largely into an accommodation room of case 102 that accommodates power control unit 21, reactor L1 is arranged on one side of motor generator MG2 and capacitor C2 is arranged on the other side. Thus, the large components are efficiently accommodated.

Furthermore, reactor L1 is accommodated on one side of motor generator MG2, in a gap portion 500 formed between the outer circumferential surface of motor generator MG2, the lower side surface of power element substrate 120 arranged above motor generator MG2, and the inner side surface of case 102.

This gap portion 500 is formed inside the horizontal dimension when the vehicle drive device is mounted on a vehicle, if the case is projected from the rotational axis direction. The horizontal dimension is defined by the projection portion of that part of the case which accommodates a damper 124, motor generator MG2, transmission reduction gear RG, differential gear DEF and power element substrate 120.

In FIG. 5, reactor L1 is arranged in gap portion 500 formed inside the horizontal dimension of the projection portion of the part that accommodates motor generator MG2 and power element substrate 120 at the time of being mounted on a vehicle. Otherwise, reactor L1 may be accommodated in a gap portion formed in any of the parts that accommodate damper 124, transmission reduction gear RG and differential gear DEF.

Furthermore, gap portion 500 is formed inside the vertical dimension of the projection portion of that part of the case which accommodates power element substrate 120 and motor generator MG2 at the time of being mounted on a vehicle. It is noted that power element substrate 120 is arranged such that the height of the projection portion of that part of the case which accommodates power element substrate 120 at the time of being mounted on a vehicle at least does not exceed the height of the remaining space of the case, that is, the parts that accommodate damper 124, motor generator MG2, reduction gear RG and differential gear DEF at the time of being mounted on a vehicle. Thus, it can be understood that power element substrate 120, reactor L1 and capacitor C2 which constitute power control unit 21 are arranged inside the vertical dimension defined by the outer edge of the case portion accommodating differential gear DEF and the outer edge of the case portion accommodating damper 124.

Then, gap portion 500 is formed to have an outline including a lower side surface of flat-shaped power element substrate 120, a part of the outer circumferential surface of circle-shaped motor generator MG2 and the inner side surface of case 102, and has an approximately triangular shape.

Then, in the present invention, as shown in FIG. 5, reactor L1 is configured to have a core having an approximately triangular shape similar to this gap portion 500. Because of such a configuration, reactor L1 can be accommodated in gap portion 500 efficiently.

In this manner, the case is configured and power control unit 21 is arranged in such a manner that, in the horizontal direction at the time of being mounted on a vehicle, the projection portion of that part of the case which accommodates power control unit 21 is positioned in the remaining space of the case, that is, inside the projection portion of the part that accommodates damper 124, motor generator MG2, transmission reduction gear RG and differential gear DEF. Accordingly, a compact drive device of a hybrid vehicle is realized.

In addition, the case is configured and power control unit 21 is arranged in such a manner that the height of the projection portion of that part of the case which accommodates power control unit 21 at least does not exceed the height of the projection portion of the remaining space of the case. Accordingly, the center of gravity of the vehicle can be kept low, thereby increasing the driving stability.

Figure 6:
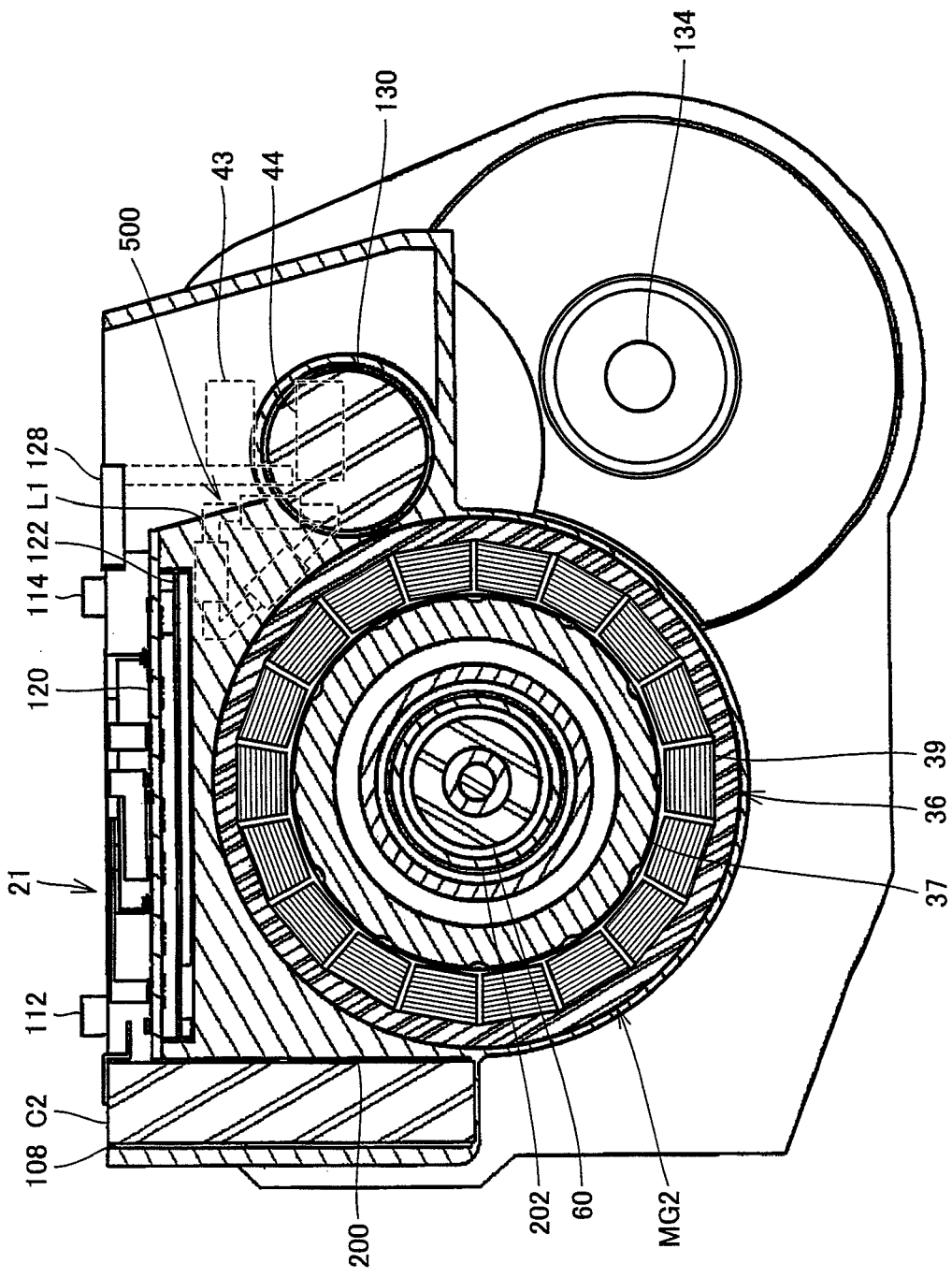
FIG. 6 is a cross-sectional view in section VI-VI in FIG. 4.

FIG. 6 is a cross-sectional view in section VI-VI in FIG. 4.

Referring to FIG. 6, the cross section of motor generator MG2 and the cross section of the accommodation room accommodating power control unit 21 are shown.

The drive device of a hybrid vehicle includes motor generator MG2 and motor generator MG1 arranged at the back of motor generator MG2, each rotor having the rotational center axis arranged on the same axis, a power split mechanism arranged on the same axis as the rotational center axis of the crankshaft and between motor generators MG1 and MG2, and power control unit 21 performing control of motor generators MG1, MG2.

In power control unit 21, reactor L1 is arranged at least on one side and smoothing capacitor C2 is separately arranged on the other side with respect to the rotational center axis of motor generator MG2. In particular, reactor L1 is arranged in gap portion 500 formed between the lower side surface of power element substrate 120, the outer circumferential side surface of motor generator MG2 and the inner side surface of case 102, and has an approximately triangular shape, as described above. Motor generators MG1, MG2, power split mechanism PSD and power control unit 21 are accommodated and integrated in a metal case.

A partition wall portion 200 partitioning case 102 into two spaces is provided so that lubricating oil of motor generator MG2 does not leak to the power control substrate 120 side. A water channel 122 for cooling power element substrate 120 is provided in the upper surface portion of this partition wall portion 200, and this water channel 122 is in communication with cooling water inlet 114 and cooling water outlet 112 as described earlier.

Negative-side power supply potential is transmitted from terminal 44 to power element substrate 120 by a bus bar 128. Positive power supply potential is transmitted from terminal 43 to reactor L1 by another bus bar, though not shown.

Here, the part supporting rotational shaft 130 of the reduction gear extends into the accommodation room accommodating power control unit 21.

The cross-sectional part of motor generator MG2 will be described. Rotor 37, a separation wall 202 of the case, and hollow shaft 60 of the rotor are arranged on the inner circumference of stator 36.

Figure 7:
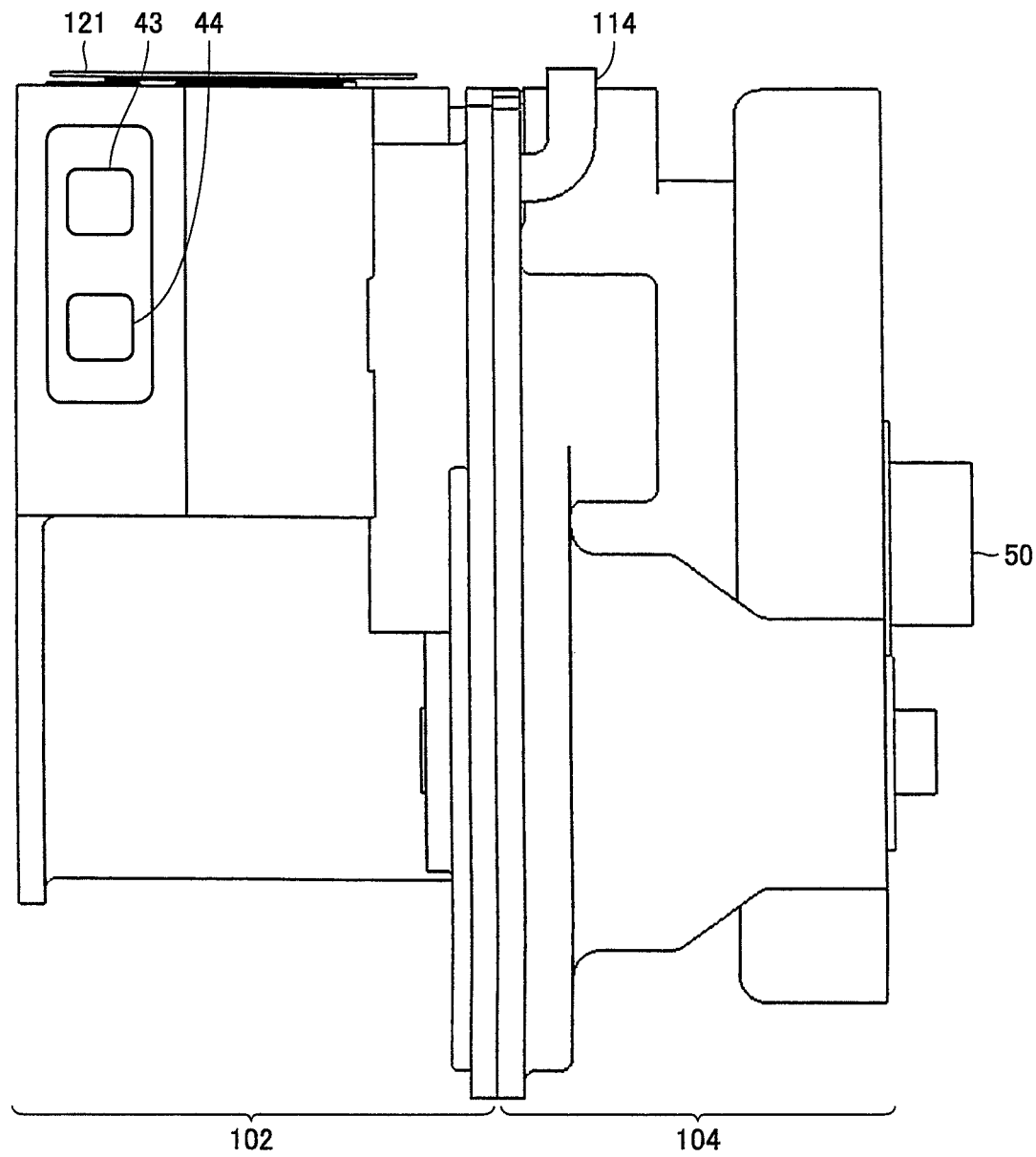
FIG. 7 is a side view of the drive device as viewed from X2 direction in FIG. 4.

FIG. 7 is a side view of drive device 20 as viewed from X2 direction in FIG. 4. In FIG. 7, a control board 121 for controlling a power element is arranged on the upper portion of the power element substrate.

Figure 8:
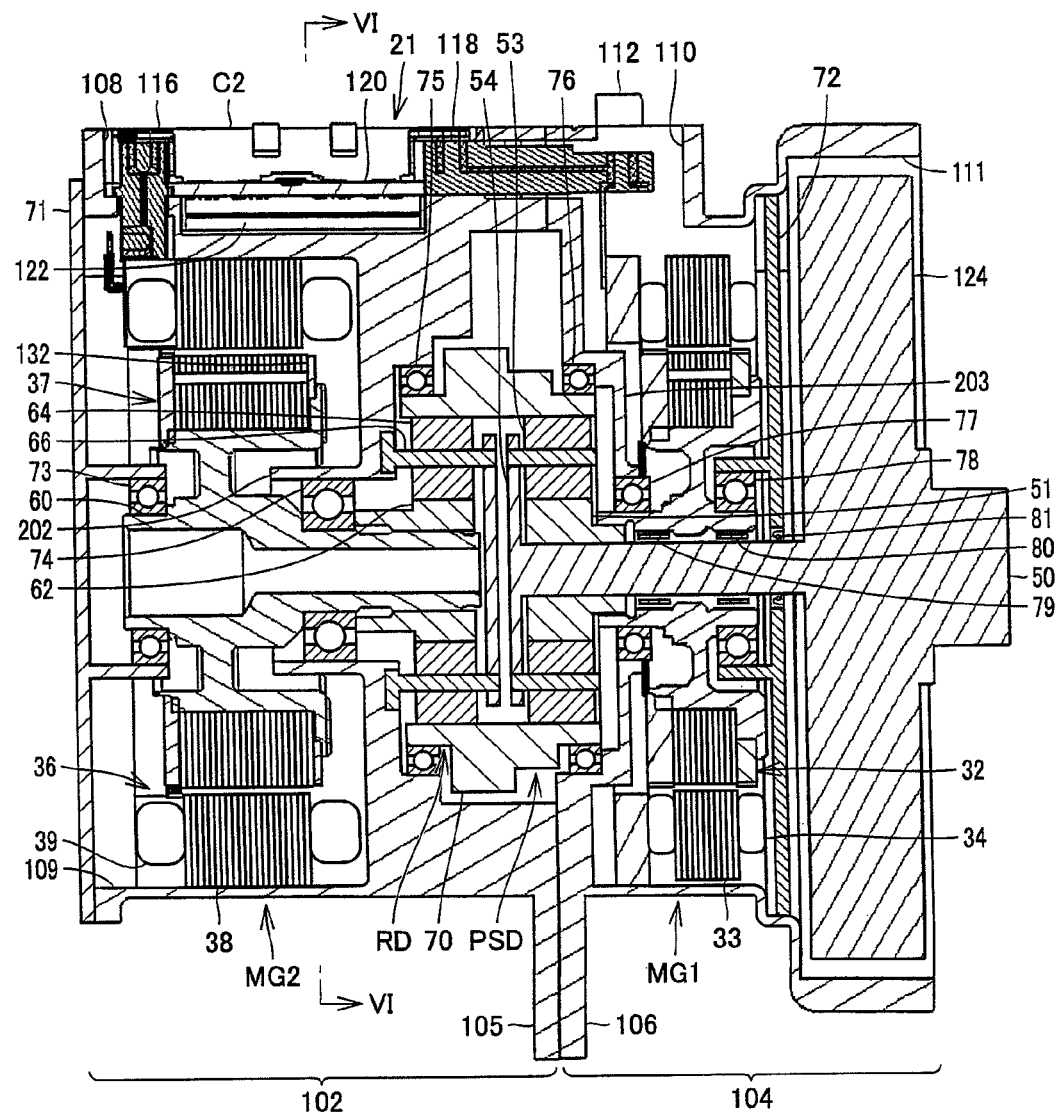
FIG. 8 is a cross-sectional view along VIII-VIII in FIG. 4.

FIG. 8 is a cross-sectional view along VIII-VIII in FIG. 4.

Referring to FIG. 7, FIG. 8, crankshaft 50 of the engine is connected to damper 124, and the output shaft of damper 124 is connected to power split mechanism PSD.

From the side on which the engine is arranged, damper 124, motor generator MG1, power split mechanism PSD, reduction device RD and motor generator MG2 are arranged in this order to extend on the same rotational shaft. The shaft of rotor 32 of motor generator MG1 is hollow, and the output shaft from damper 124 passes through this hollow portion.

The shaft of rotor 32 of motor generator MG1 is spline-fitted in sun gear 51 on the power split mechanism PSD side. The shaft of damper 124 is coupled to planetary carrier 54. Planetary carrier 54 supports the rotational shaft of pinion gear 53 rotatably around the shaft of damper 124. Pinion gear 53 meshes with sun gear 51 and ring gear 52 in FIG. 2 formed on the inner circumference of the ring gear case.

Furthermore, the reduction device RD side of shaft 60 of motor generator MG2 is spline-fitted in sun gear 62. Planetary carrier 66 of reduction device RD is fixed to separation wall 202 of case 102. Planetary carrier 66 supports the rotational shaft of pinion gear 64. Pinion gear 64 meshes with sun gear 62 and ring gear 68 in FIG. 2 formed on the inner circumference of the ring gear case.

As can be understood from FIG. 8, motor generator MG1 and damper 124 can be installed from opening portion 111 of case 104 in the right direction in the figure, motor generator MG2 can be installed from opening portion 109 of case 102 in the left direction, and reduction device RD and power split mechanism PSD can be installed from the joint portion between flanges 105 and 106.

Opening portion 109 of case 102 is sealed by a cover 71 and liquid gasket or the like so that lubricating oil does not leak. At the back of opening portion 111 of case 104, a cover 72 is provided, and the space accommodating motor generator MG1 is sealed by liquid gasket or the like and an oil sheet 81 so that lubricating oil does not leak.

The shaft of rotor 32 of motor generator MG1 is rotatably supported by a ball bearing 78 provided between the shaft and cover 72 and a ball bearing 77 provided between the shaft and a separation wall 203. The shaft of rotor 32 is hollow, and the shaft of damper 124 passes through the interior thereof. Needle bearings 79, 80 are provided between the shaft of rotor 32 and the shaft of damper 124.

The shaft of rotor 37 of motor generator MG2 is rotatably supported by a ball bearing 73 provided between the shaft and cover 71 and a ball bearing 74 provided between the shaft and separation wall 202.

The ring gear case in which both the ring gear of reduction device RD and the ring gear of power split mechanism PSD are cut on the inner circumference thereof is rotatably supported by a ball bearing 75 provided between the ring gear case and separation wall 202 and a ball bearing 76 provided between the ring gear case and a separation wall 203.

Although the accommodation room accommodating power control unit 21 and the accommodation room accommodating motor generator MG2 are separated by separation wall 202 of case 102, they are partially connected to each other by a through-hole into which terminal base 116 is inserted. This terminal base 116 has one side connected to a bus bar of the stator coil of motor generator MG2 and the other side connected to a bus bar of inverter 14. Then, a conductive member passes through the interior of terminal base 116 to allow these bus bars to be electrically connected. In other words, terminal base 116 is configured such that a lubricating oil component from the motor generator MG2 side does not pass and electricity passes.

Similarly, by means of terminal base 118, the space in which power control unit 21 is accommodated and the space in which motor generator MG1 is accommodated are connected to each other in such a state in that electricity passes and a lubricating oil component does not pass.

Figure 9:
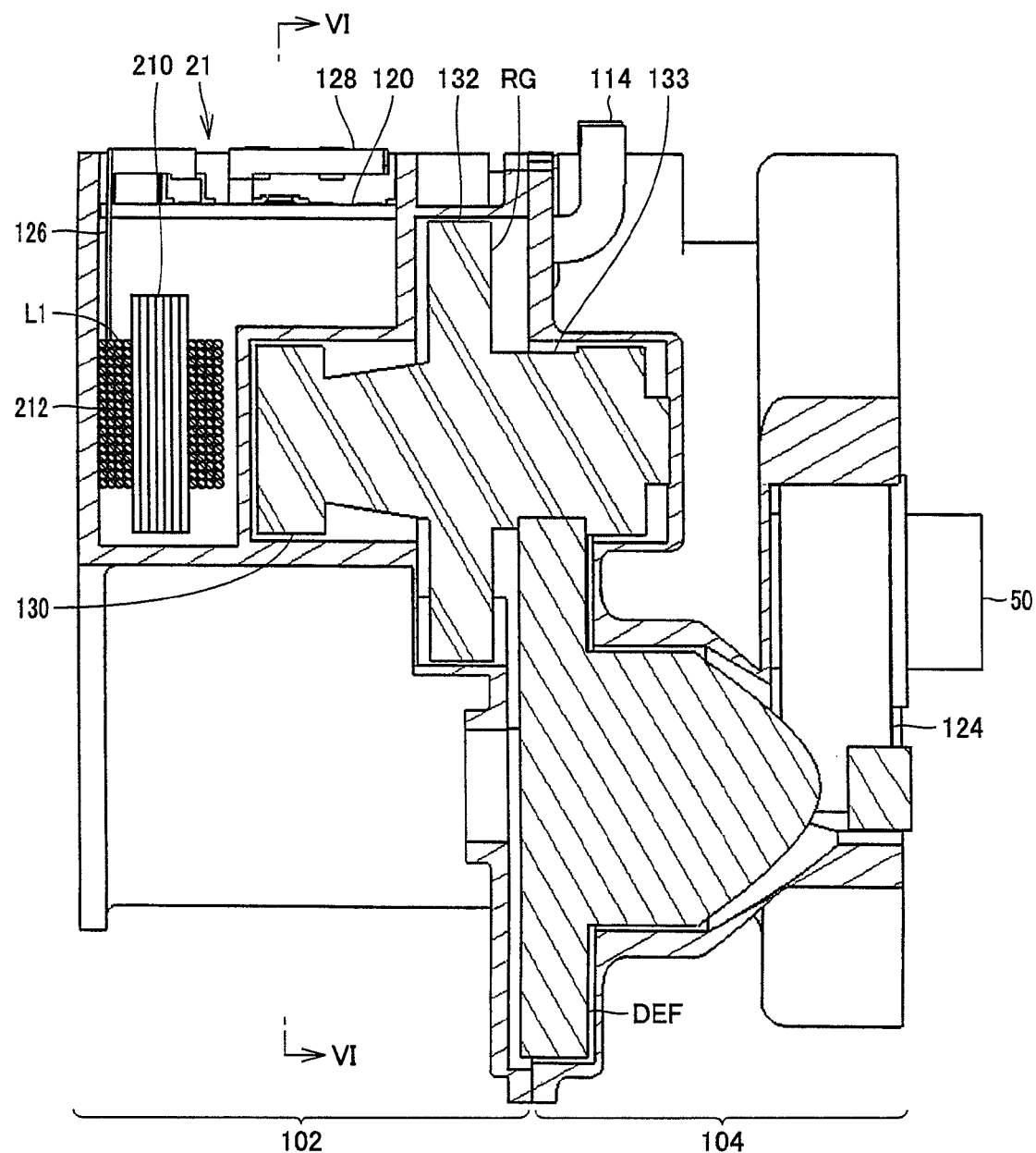
FIG. 9 is a cross-sectional view showing a section along IX-IX in FIG. 4.

FIG. 9 is a cross-sectional view showing a cross section taken along IX-IX in FIG. 4.

Referring to FIG. 9, in the accommodation room accommodating power control unit 21, a cross section of reactor L1 is shown. Reactor L1 has, for example, a structure in which a coil 212 is wound around a core 210 formed by stacking electromagnetic steel plates. It is noted that reactor L1 is accommodated in a gap portion having an approximately triangular shape formed between the lower side surface of power element substrate 120 and the outer circumferential side surface of motor generator MG2 (not shown) arranged at the back in the sheet. Therefore, core 210 has an approximately triangular shape corresponding to the shape of the gap portion.

Then, adjacent to reactor L1, rotational shaft 130 of transmission reduction gear RG shown in FIG. 6 is arranged, and a counter driven gear 132 of transmission reduction gear RG is shown in the middle portion. This counter driven gear 132 meshes with counter drive gear 70 in FIG. 2. Then, a final drive gear 133 is provided on the same axis as this counter driven gear 132, and differential gear DEF which is a final driven gear meshing therewith is shown below.

[Description of Reactor L1]

Figure 10:
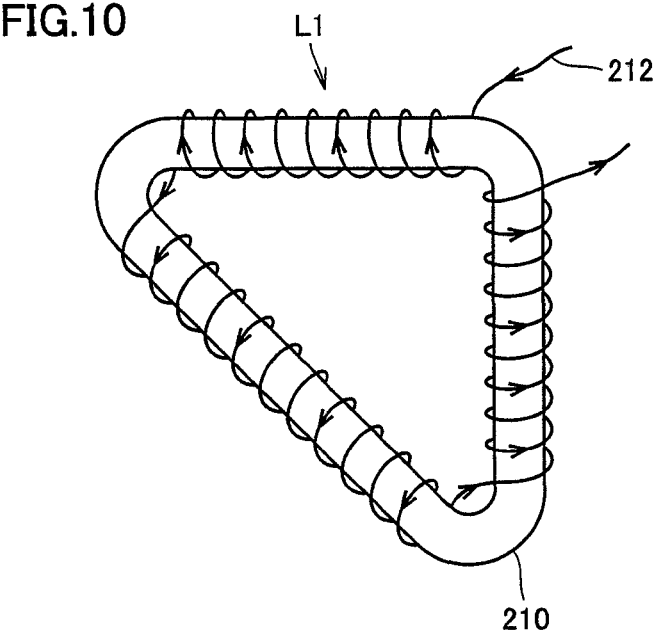
FIG. 10 is a perspective view showing an exemplary structure of a reactor.

FIG. 10 is a perspective view showing an exemplary structure of reactor L1.

Referring to FIG. 10, reactor L1 is formed of core 210 having an approximately triangular shape and coil 212 wound around each of three linear portions of core 210.

Core 210 is formed, for example, by stamping an approximately triangular plate-like body set based on the shape of gap portion 500 shown in FIG. 5 and FIG. 6 from an electromagnetic steel plate and stacking a plurality of these plate-like bodies.

Here, the structure of reactor L1 has been described by taking an example in which core 210 is formed in an approximately triangular shape similar to gap portion 500 so that reactor L1 can efficiently fit in gap portion 500 formed between the lower side surface of power element substrate 120 and the outer circumferential side surface of motor generator MG2. However, it is obvious that the present invention is not necessarily limited to an approximately triangular shape as long as the shape fits in gap portion 500.

In addition, application of the structures described in the following modifications to reactor L1 also allows reactor L1 to efficiently fit in gap portion 500.

First Modification

Figure 11:
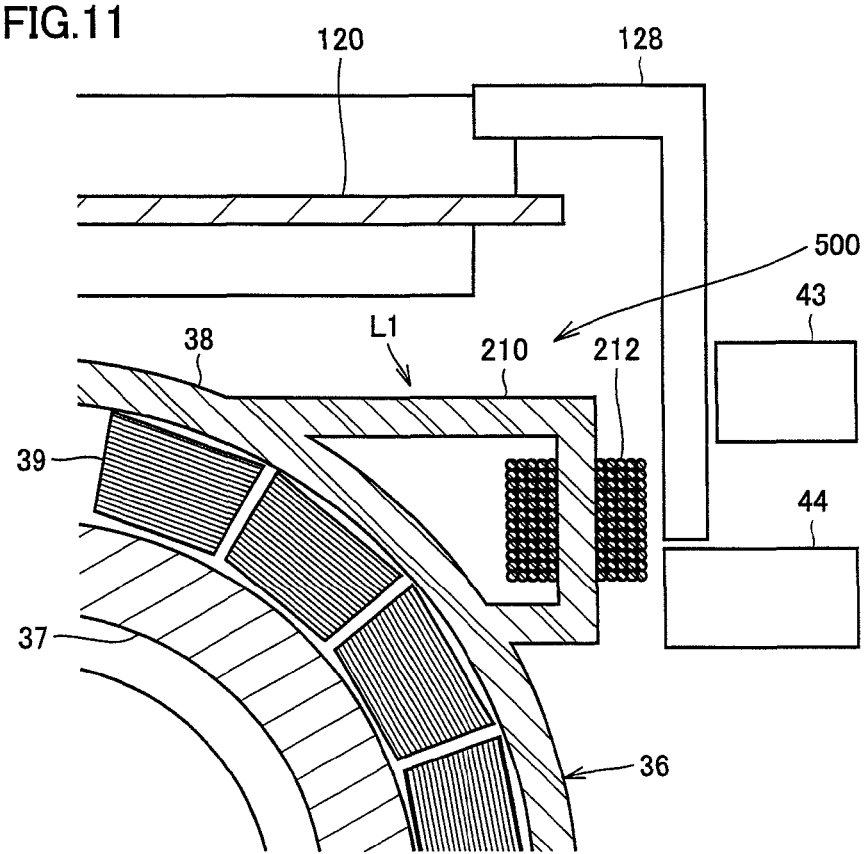
FIG. 11 is a cross-sectional view illustrating another example of a structure of the reactor.

FIG. 11 is a cross-sectional view illustrating another example of the structure of reactor L1. It is noted that FIG. 11 shows a modified portion in accordance with the present first modification, in enlargement, of the cross-sectional view shown in FIG. 6.

Referring to FIG. 11, reactor L1 in accordance with the present first modification is characterized in that core 210 is formed by extending a part of stator core 38 of motor generator MG2.

Specifically, stator 36 of motor generator MG2 is arranged on the outer circumferential side of rotor 37, as described above, and includes stator core 38 and three-phase coil 39 wound around stator core 38.

In the present first modification, a part of this stator core 38 braches off to be disposed in gap portion 500 between the lower side surface of power element substrate 120, the outer circumferential side surface of motor generator MG2 and the inner side surface of case 102, so that this part functions as core 210 of reactor L1. Then, reactor L1 is formed by winding coil 212 around this part.

It is noted that, in accordance with the present first modification, stator core 38, which has a cross section in which an ordinarily annular shape partially protrudes in the rotational shaft direction, can be formed easily by stacking electromagnetic steel plates having the same shape as the cross section.

Because of such a configuration of reactor L1, similarly to the foregoing first embodiment, reactor L1 can efficiently be accommodated by effectively using an empty space formed in the case. As a result, size reduction and space saving of a drive device of a hybrid vehicle are realized.

Second Modification

As described above, a compact drive device of a hybrid vehicle can be realized by arranging reactor L1 using an empty space formed in the interior of the case.

Here, if reactor L1 can be further reduced in size, the occupied space of reactor L1 can be reduced, thereby allowing a drive device to be even more compact.

Then, the following modification is characterized in that a reactor function is added to power cables 6, 8 disposed between drive device 20 and battery unit 40 so that power cables 6, 8 are burdened with part of reactance of reactor L1.

Thus, a substantial reactor of boost converter 12 is comprised of reactor L1 included in drive device 20 and a reactor component of power cables 6, 8. Therefore, as compared with the case where a reactor function is not added to power cables 6, 8, reactor L1 can be formed of the one having lower reactance. As a result, reactor L1 can be further reduced in size, thereby achieving further size reduction and space saving of drive device 20.

Figure 12:
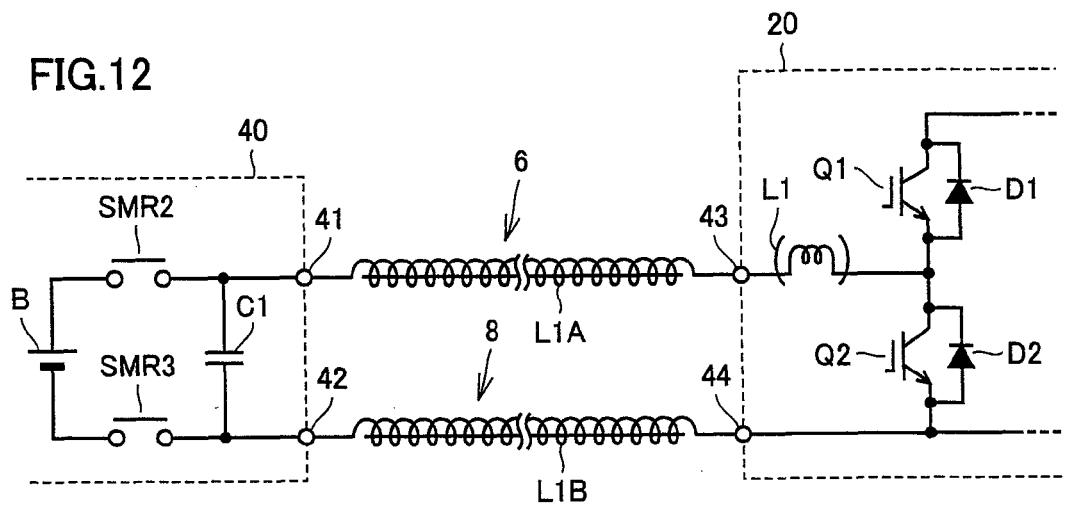
FIG. 12 is a diagram illustrating a connection part of a power cable.

FIG. 12 is a diagram illustrating a connection part of power cables 6, 8.

Figure 13:
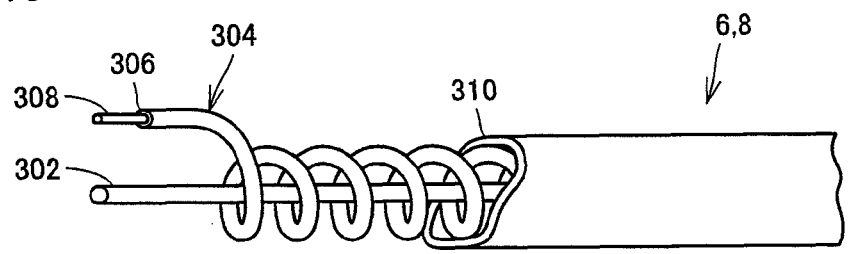
FIG. 13 is a view illustrating a structure of the power cable.

FIG. 13 is a view illustrating a structure of power cables 6, 8.

Referring to FIG. 12, FIG. 13, in a vehicle, a motor drive system includes battery unit 40, a boost converter boosting direct-current voltage from battery B, an inverter receiving the boosted voltage from the boost converter to drive a motor, and power cables 6, 8 connecting battery unit 40 to the boost converter.

Power cable 6 connected between terminal 41 and terminal 43 includes a magnetic material core 302 serving as a core of the power cable, a conductive line 304 spirally wrapping around magnetic material core 302, and a sheath 310 sheathing magnetic material 302 and conductive line 304.

Conductive line 304 is a sheathed conductive line and is formed by applying an insulative coating 306 such as enamel onto a conductive core wire 308. As magnetic material core 302, for example an iron wire can be used.

Here, power cable 8 connected between terminal 42 and terminal 44 has also a configuration similar to that of power cable 6.

Because of such a configuration, a part of the reactor used in the boost converter can be taken out to the outside of the casing of drive device 20 and to the outside of the engine room. In other words, the reactor of the boost converter is comprised of the reactor component of power cables 6, 8 and a reactor L1A in drive device 20. In this case, reactor L1A can be formed of the smaller one with lower reactance, as compared with the case in which power cables 6, 8 in FIG. 13 are not used.

It is noted that the reactance of reactor component of power cables 6, 8 can be set to a desired value by adjusting the wiring length of the part that employs the structure shown in FIG. 13. In this case, a similar structure as a usual power cable is applied to that part of power cables 6, 8 which does not employ the structure in FIG. 13.

Third Modification

Figure 14:
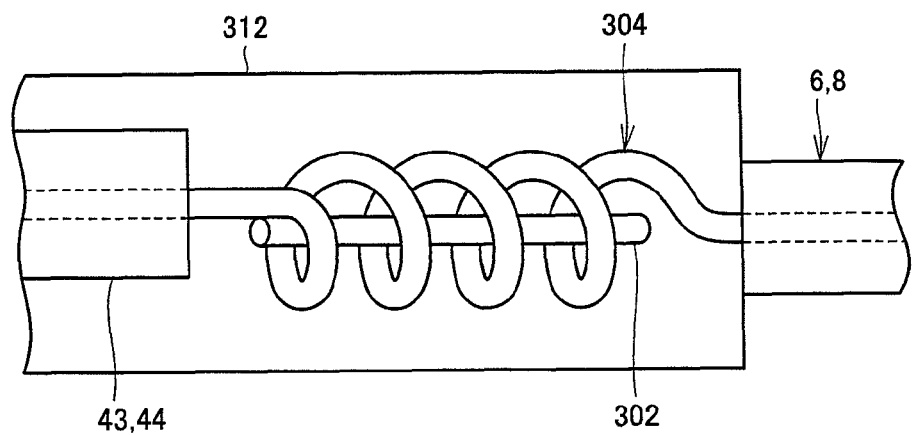
FIG. 14 is a view showing a modification of the structure shown in FIG. 13.

FIG. 14 is a view showing a modification of the structure shown in FIG. 13.

The structure shown in FIG. 14 is formed by adding a reactor function to a connector 312 for connecting terminal 43 (or 44) to power cable 6 (or 8). In this structure, power cables 6, 8 differ from the structure shown in FIG. 13 and have a structure similar to that of a usual power cable.

In FIG. 14, connector 312 includes conductive line 304 for achieving continuity between terminal 43 (or 44) and power cable 6 (or 8) in a state in which power cable 6 (or 8) is coupled, and magnetic material core 302. Conductive line 304 is spirally wrapped around magnetic material core 302.

Because of such a configuration, a part of the reactor used in the boost converter can be taken out to the outside of the casing of drive device 20. Therefore, the reactor in drive device 20 can be formed of the smaller one with low reactance.

Moreover, since the reactor function is added to connector 312, the reactor provided outside the casing can be installed integrally with drive device 20, so that the components can be shared.

Fourth Modification

Figure 15:
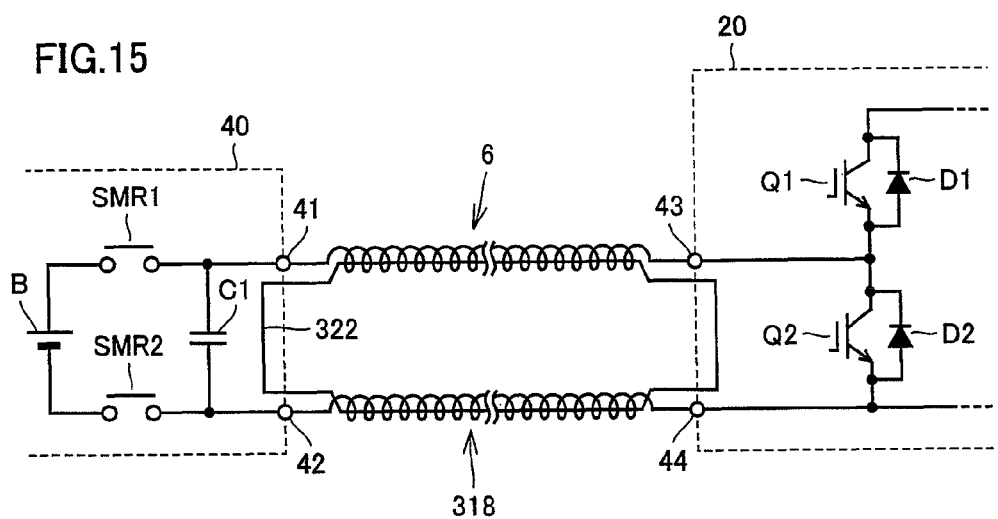
FIG. 15 is a diagram showing another modification of the configuration shown in FIG. 12.

FIG. 15 is a diagram showing another modification of the configuration shown in FIG. 12.

The configuration shown in FIG. 15 includes a power cable 318 in place of power cable 8 in the configuration shown in FIG. 12. Power cable 318 has a configuration similar to that of power cable 6 shown in FIG. 13.

Then, in the configuration shown in FIG. 15, the magnetic material core of power cable 6 and the magnetic material core of power cable 318 have respective one ends connected to each other on the battery unit 40 side and have the respective other ends connected to each other on the drive device 20 side, thereby forming an annular magnetic path 322. Thus, inductance of the reactor by the power cable is further increased, so that the reactor of the boost converter part can be formed of a smaller reactor.

As described above, in accordance with the first embodiment of the present invention, the reactor of the boost converter is arranged using an empty space formed between the power element substrate and the motor generator, so that the power control unit portion can be arranged in a compact space with a reduced height. As a result, space saving can be achieved in the engine room.

In addition, when the drive device of a hybrid vehicle is mounted on a vehicle, the center of gravity can be kept low, thereby improving the driving performance of the vehicle as compared with the conventional example.

Moreover, in this configuration, a part of the reactor of the boost converter can be taken out to the outside of the casing by adding a reactor function to the power cable connecting the drive device to the battery unit, so that the reactor in the drive device can be reduced in size. As a result, the space occupied by the reactor in the casing can be reduced, thereby achieving further size reduction and space saving of the drive device.

Second Embodiment

In the foregoing first embodiment, reactor L1 is arranged in an empty space formed in the interior of a case accommodating a drive device, thereby realizing a compact drive device of a hybrid vehicle.

A second embodiment of the present invention is characterized in that capacitor C2 which occupies a large space similarly to reactor L1 is also arranged using an empty space in the interior of the case, thereby achieving further size reduction and space saving.

It is noted that a drive device of a hybrid vehicle in accordance with the present embodiment differs from the drive device of a hybrid vehicle in accordance with the foregoing first embodiment only in the arrangement structure of capacitor C2, and therefore a detailed description of a common part will not be repeated.

Figure 16:
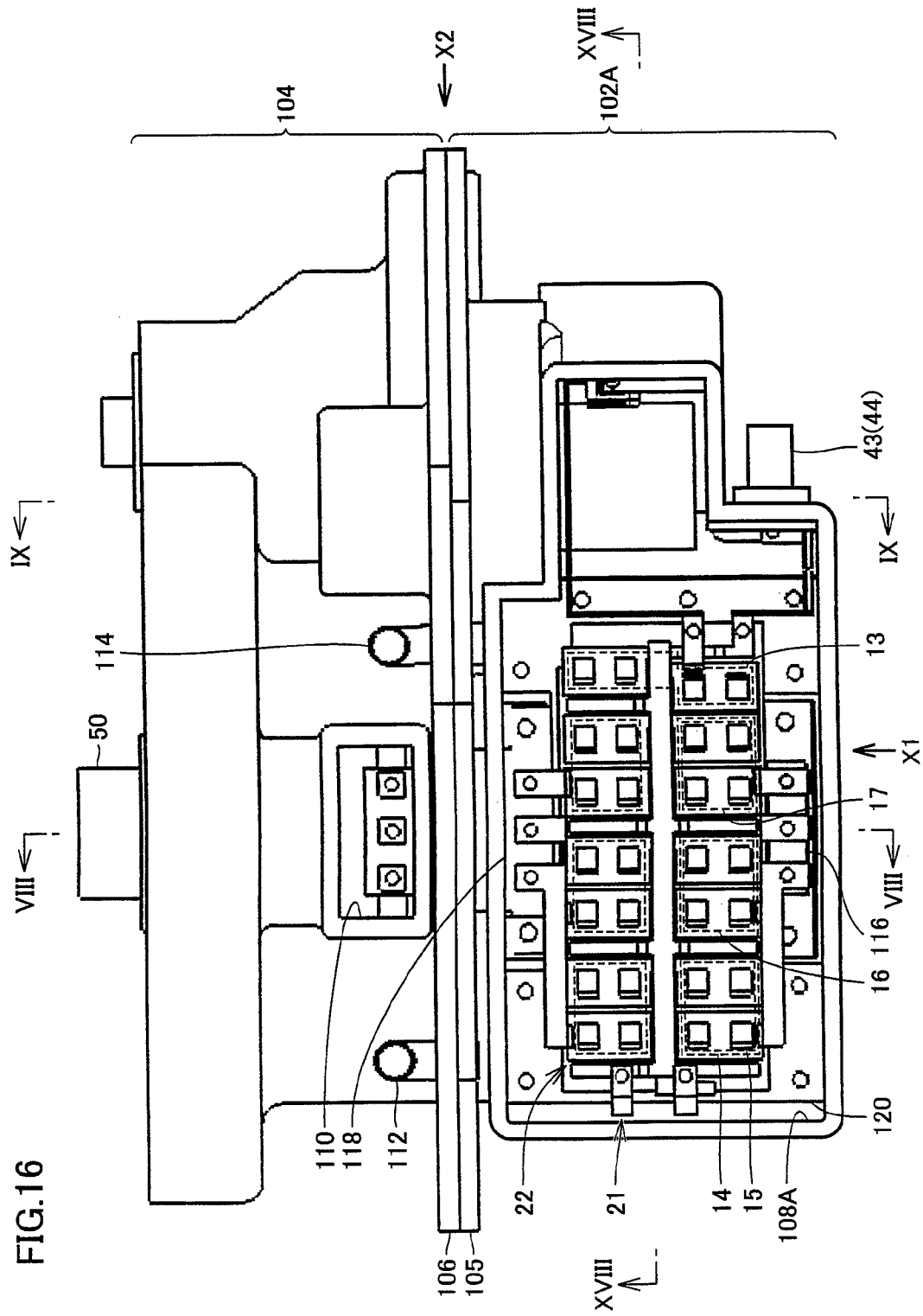
FIG. 16 is a plan view of a drive device in accordance with a second embodiment of the present invention.

FIG. 16 is a plan view of a drive device 20A in accordance with the second embodiment of the present invention.

Referring to FIG. 16, a case of drive device 20A is configured such that it can be divided into case 104 and a case 102A. Case 104 is a part that mainly accommodates motor generator MG1, and case 102A is a part that mainly accommodates motor generator MG2 and a power control unit.

Case 102A is provided with an opening portion 108A for installing a power control unit. Power element substrate 120 and terminal bases 116, 118 are accommodated in this opening portion 108A. Then, below power element substrate 120, capacitor C2 is accommodated in the left-side portion (the vehicle travel direction side) and reactor L1 is accommodated in the right-side portion (neither shown). Here, this opening portion 108A is closed by a cover in a vehicle-mounted state. Alternatively, places may be changed in such a manner that capacitor C2 is accommodated on the right side and reactor L1 is accommodated on the left side.

In other words, reactor L1 is arranged on one side of the rotational shafts of motor generators MG1 and MG2, and capacitor C2 is arranged on the other side of the rotational shafts. Then, power element substrate 120 is arranged above capacitor C2 and reactor L1.

Then, the second embodiment of the present invention is characterized in that reactor L1 is arranged on one side of the rotational shafts of motor generators MG1 and MG2, in a gap portion formed between the lower side surface of power element substrate 120 and the outer circumferential side surface of motor generator MG2, and capacitor C2 is arranged on the other side of the rotational shafts of motor generators MG1 and MG2, in a gap portion formed between the lower side surface of power element substrate 120 and the outer circumferential side surface of motor generator MG2.

It is noted that the arrangement structure of reactor L1 is similar as described in the foregoing first embodiment. In the following, a detailed arrangement structure of capacitor C2 will be described.

Figure 17:
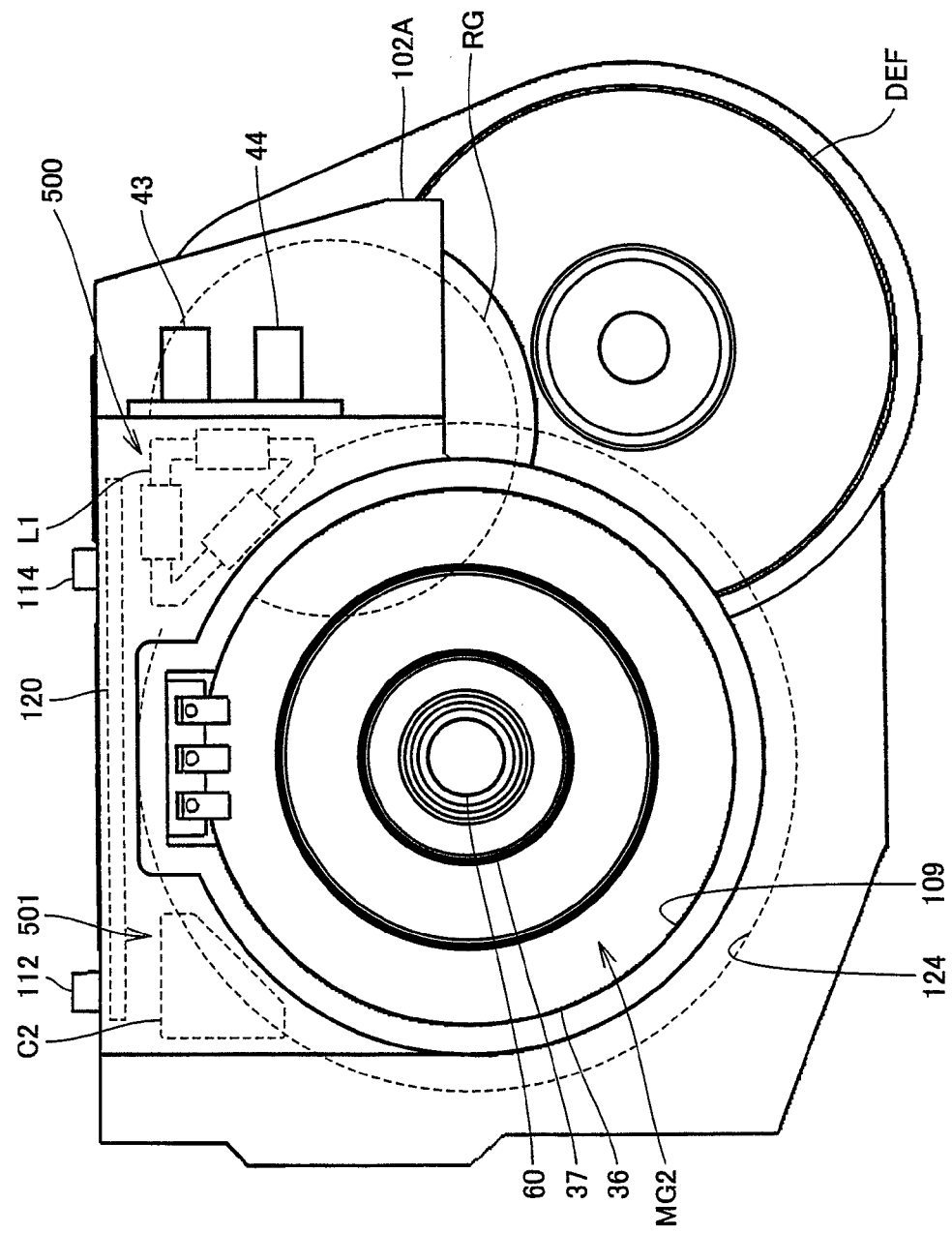
FIG. 17 is a side view of the drive device as viewed from X1 direction in FIG. 16.

FIG. 17 is a side view of drive device 20A as viewed from X1 direction in FIG. 16.

Referring to FIG. 17, case 102A is provided with opening portion 109 for installation and maintenance of the motor generator, and this opening portion 109 is closed by a cover in a vehicle-mounted state.

Inside opening portion 109, motor generator MG2 is arranged. Rotor 37 is arranged in the interior of stator 36 to which bus bars of U, V, W phases are connected. Hollow shaft 60 is seen in the center portion of rotor 37.

As shown in FIG. 17, since stator 36 of motor generator MG2 largely extends into the accommodation room of case 102 that accommodates power control unit 21, reactor L1 is arranged on one side of motor generator MG2 and capacitor C2 is arranged on the other side. Thus, the large components are efficiently accommodated.

In detail, reactor L1 is accommodated on one side of motor generator MG2, in gap portion 500 formed between the outer circumferential side surface of motor generator MG2 and the lower side surface of power element substrate 120 arranged above motor generator MG2.

In addition, capacitor C2 is arranged on the other side of motor generator MG2, in a gap portion 501 formed between the outer circumferential side surface of motor generator MG2 and the lower side surface of power element substrate 120 arranged above motor generator MG2.

Here, if case 102A is projected from the rotational axis direction, gap portions 500, 501 formed on opposite sides with respect to the rotational shaft of motor generator MG2 are each formed inside the horizontal dimension of the projection portion of that part of case 102A which accommodates damper 124, motor generator MG2, transmission reduction gear RG, differential gear DEF and power element substrate 120 at the time of being mounted on a vehicle. In addition, if case 102A is projected from the rotational shaft direction, gap portions 500, 501 are formed inside the vertical dimension of the projection portion of that part of case 102A which accommodates power element substrate 120 and motor generator MG2 at the time of being mounted on a vehicle.

Then, gap portions 500, 501 are each formed to have an outline including the lower side surface of the flat-shaped power element substrate 120, a part of the outer circumferential side surface of the circle-shaped motor generator MG2 and the inner side surface of case 102A, and has an approximately triangular shape.

Therefore, in the second embodiment of the present invention, capacitor C2 is configured to have an approximately triangular shape similar to this gap portion 501, as shown in FIG. 17, similarly to reactor L1.

Because of such a configuration, in the state in which transmission reduction gear RG and differential gear DEF are arranged, in addition to motor generators MG1, MG2, reduction device RD and power split mechanism PSD, power element substrate 120, reactor L1 and capacitor C2 which are components of power control unit 21 are arranged using the surrounding empty space. As a result, a compact drive device of a hybrid vehicle can be realized with a reduced height.

In addition, an empty space on one side of motor generator MG2 in FIG. 5 is not only used, but reactor L1 and capacitor C2 are respectively arranged efficiently in empty spaces on opposite sides, thereby improving the balance of weight to motor generator MG2 and, in addition, achieving further space saving.

Figure 18:
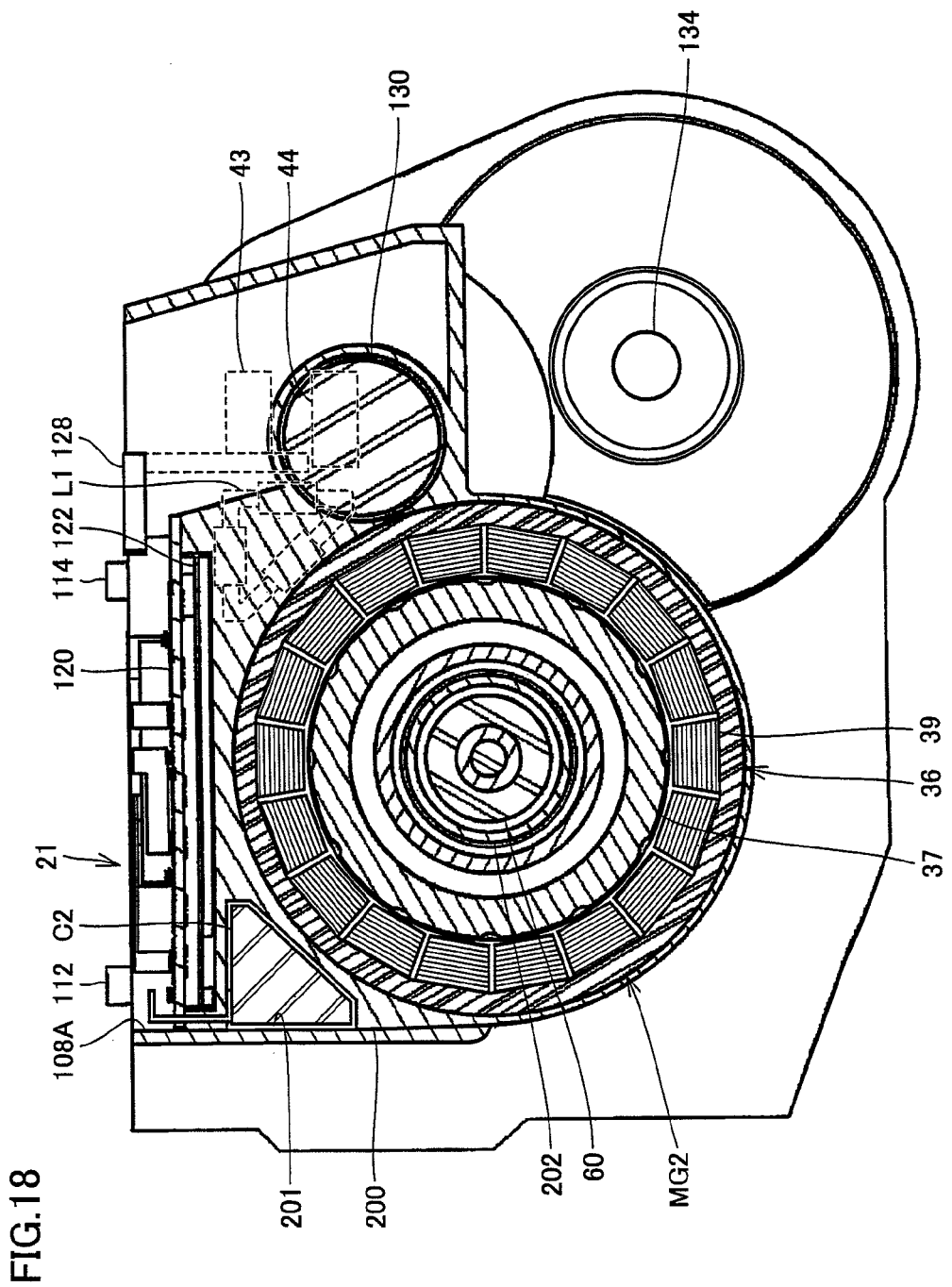
FIG. 18 is a cross-sectional view in section XVIII-XVIII in FIG. 16.

FIG. 18 is a cross-sectional view in section XVIII-XVIII in FIG. 16.

Referring to FIG. 18, a cross section of motor generator MG2 and a cross section of an accommodation room accommodating power control unit 21 are shown.

The configuration shown in FIG. 18 differs from the configuration shown in FIG. 6 only in the arrangement structure of capacitor C2. Therefore, detailed description of a common part will not be repeated.

In detail, in FIG. 18, capacitor C2 is arranged in an accommodation portion 201 newly provided to partition wall portion 200 for partition between motor generator MG2 and power element substrate 120.

Accommodation portion 201 is provided on the side opposite to reactor L1 with respect to the rotational center axis of motor generator MG2. Accommodation room 201 is formed using an empty space formed between the lower side surface of power element substrate 120 and the outer circumferential side surface of motor generator MG2. Accommodation room 201 has an approximately triangular shape similar to the shape of the empty space.

Then, capacitor C2 is accommodated in accommodation portion 201 having an approximately triangular shape. Capacitor C2 has an approximately triangular-shaped structure to fit in accommodation portion 201.

Figure 19:
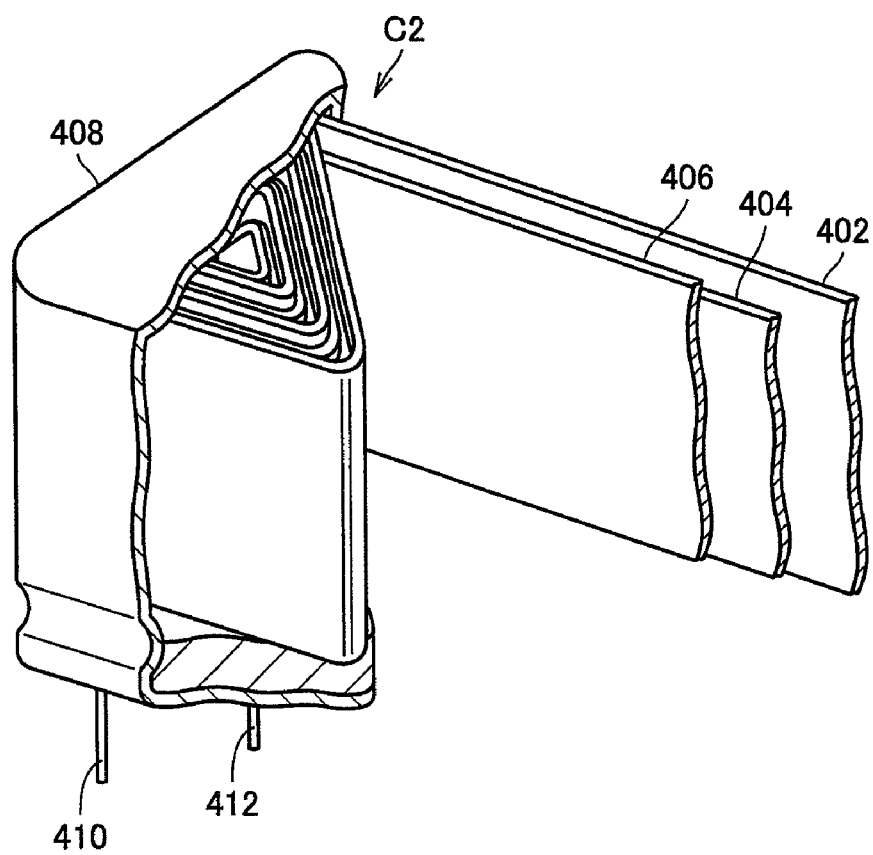
FIG. 19 is a partially-cut perspective view showing an exemplary structure of a capacitor in accordance with the second embodiment of the present invention.

FIG. 19 is a partially-cut perspective view showing an exemplary structure of capacitor C2 in accordance with the second embodiment of the present invention.

Referring to FIG. 19, capacitor C2 is formed of, for example, an aluminum electrolytic capacitor having an aluminum oxide coating as dielectric. As well known, an aluminum electrolytic capacitor is characterized by having a large capacitance in spite of its small size, because of an electrode area enlarged by roughing the surface, as compared with a film capacitor having organic polymer as dielectric. Therefore, in the drive device, it is suitable for smoothing capacitor C2 which requires a relatively large capacitance so that a voltage surge produced on the output side of boost converter 12 can be absorbed.

In detail, capacitor C2 has a casing 408 formed in an approximately triangular shape as an exterior member and is structured such that a single stack unit of an aluminum anode foil 402, an electrolytic paper 404 and an aluminum cathode foil 406 is wound.

Aluminum anode foil 402 is formed by roughing the surface of a high-purity aluminum foil by etching to enlarge the surface area and then forming an aluminum oxide coat by anodic oxidation (forming).

Aluminum cathode foil 406 is formed by roughing the surface of an aluminum foil. Aluminum cathode foil 406 plays a role of bringing an external terminal and an electrolytic solution into electrical contact.

Electrolytic paper 404 plays a role of preventing contact between the opposite electrode foils and holding the electrolytic solution contained therein.

External terminals 410, 412 each have one end connected to a corresponding electrode and the other end taken out to the outside of casing 408.

Then, as shown in FIG. 19, aluminum anode foil 402-electrolytic paper 404-aluminum cathode foil 404 are stacked in this order as a single stack unit, which is then wound in an approximately triangular shape, thereby forming capacitor C2.

Here, it is obvious that the shape in which the stack unit is wound is not necessarily limited to an approximately triangular shape as long as the shape fits in gap portion 501 formed between power element substrate 120 and motor generator MG2.

Furthermore, capacitor C2 applied in the second embodiment of the present invention is not limited to an aluminum electrolytic capacitor, and any capacitor may be adopted as long as its shape can be freely changed according to the shape of the gap portion.

As described above, in accordance with the second embodiment of the present invention, a reactor and a smoothing capacitor of a boost converter, both of which are formed of relatively large components, are respectively accommodated using empty spaces formed in the interior of the case accommodating the drive device, thereby achieving even further size reduction and space saving of the drive device. Accordingly, when the drive device of a hybrid vehicle is mounted on a vehicle, the center of gravity can be kept low, thereby improving the driving performance of the vehicle as compared with conventional examples. Moreover, further space saving can be achieved in the engine room.

Furthermore, although, in the present embodiment, an example in which the present invention is applied to a hybrid vehicle has been described, the present invention is not limited thereto and is applicable to, for example, electric automobiles, fuel cell automobiles, and the like.

The embodiments disclosed herein should be understood as being illustrative rather than limitative in all respects. The scope of the present invention is not shown in the foregoing description but in the claims, and equivalents to the claims and all modifications within the claims are intended to be embraced.

INDUSTRIAL APPLICABILITY

The present invention is applicable to a drive device of a hybrid vehicle.

The invention claimed is:

1. A drive device of a hybrid vehicle comprising:
   a damper having a crankshaft of an internal combustion engine coupled thereto;
   an electric rotating machine having its rotational shaft arranged to overlap with a rotational shaft of said damper;
   a power transmission mechanism combining motive power generated by said internal combustion engine with motive power generated by said electric rotating machine for transmission to a drive shaft;
   a power control unit performing control of said electric rotating machine; and
   a case accommodating said damper, said electric rotating machine, said power transmission mechanism and said power control unit, wherein
   said power control unit includes
   a circuit substrate having a power element of at least one of an inverter and a voltage converter mounted thereon, and
   a reactor arranged, if being projected from said rotational shaft direction, in a gap portion formed inside a horizontal dimension of a projection portion of that part of said case which accommodates said damper, said electric rotating machine, said power split mechanism, and said circuit substrate a time of being mounted on said hybrid vehicle.

2. The drive device of a hybrid vehicle according to claim 1, wherein said gap portion includes
   a first gap portion formed on one side with respect to a rotational center axis of said electric rotating machine and
   a second gap portion formed on the other side with respect to the rotational center axis of said electric rotating machine, and
   said reactor is arranged in said first gap portion.

3. The drive device of a hybrid vehicle according to claim 2, wherein said reactor includes
   a core having a shape similar to said first gap portion and
   a coil wound around said core.

4. The drive device of a hybrid vehicle according to claim 2, wherein said reactor includes
   a core branching off from a stator core of said electric rotating machine to be disposed in said first gap portion and
   a coil wound around said core.

5. The drive device of a hybrid vehicle according to claim 2, wherein
   said power control unit further includes a capacitor placed between said power element and said inverter to smooth voltage-converted direct-current voltage for input to said inverter, and
   said capacitor is arranged in said second gap portion.

6. The drive device of a hybrid vehicle according to claim 5, wherein said capacitor is a film capacitor formed of a shape similar to said second gap portion.

7. The drive device of a hybrid vehicle according to claim 1, further comprising a power cable connecting said voltage converter to a power supply, wherein
said power cable includes
a magnetic material core serving as a core of said power cable and
a conductive line spirally wrapped around said magnetic material core.

8. The drive device of a hybrid vehicle according to claim 1, further comprising first and second power cables connecting said voltage converter to a power supply, wherein
each of said first and second power cables includes
a magnetic material core serving as a core of the cable and
a conductive line spirally wrapped around said magnetic material core, and
the magnetic material core of said first power cable and the magnetic material core of said second power cable have respective one ends connected to each other and the respective other ends connected to each other to form an annular magnetic path.

9. The drive device of a hybrid vehicle according to claim 1, further comprising a connection member attached to an exterior of said case for electrically connecting said voltage converter and said power cable, wherein
said connection member includes
a conductive line disposed between one terminal and the other terminal, and
a magnetic material core spirally wrapped with said conductive line.

10. A drive device of a hybrid vehicle comprising:
an electric rotating machine;
a power control unit performing control of said electric rotating machine; and
a case accommodating said electric rotating machine and said power control unit, wherein
said power control unit includes
a circuit substrate having a power element of at least one of an inverter and a voltage converter mounted thereon and being arranged above said electric rotating machine at a time of being mounted on a vehicle, and
a reactor arranged, if being projected from said rotational shaft direction, in a gap portion formed inside a vertical dimension of a projection portion of that part of said case which accommodates said electric rotating machine and said circuit substrate at a time of being mounted on said hybrid vehicle, said gap portion having an outline including a lower side surface of said circuit substrate, an outer circumferential side surface of said electric rotating machine and an inner side surface of said case.

11. The drive device of a hybrid vehicle according to claim 10, wherein said gap portion includes
a first gap portion formed on one side with respect to a rotational center axis of said electric rotating machine and
a second gap portion formed on the other side with respect to the rotational center axis of said electric rotating machine, and
said reactor is arranged in said first gap portion.

12. The drive device of a hybrid vehicle according to claim 10, further comprising a power cable connecting said voltage converter to a power supply, wherein
said power cable includes
a magnetic material core serving as a core of said power cable and
a conductive line spirally wrapped around said magnetic material core.

13. The drive device of a hybrid vehicle according to claim 10, further comprising first and second power cables connecting said voltage converter to a power supply, wherein
each of said first and second power cables includes
a magnetic material core serving as a core of the cable and
a conductive line spirally wrapped around said magnetic material core, and
the magnetic material core of said first power cable and the magnetic material core of said second power cable have respective one ends connected to each other and the respective other ends connected to each other to form an annular magnetic path.

14. The drive device of a hybrid vehicle according to claim 10, further comprising a connection member attached to an exterior of said case for electrically connecting said voltage converter and said power cable, wherein
said connection member includes
a conductive line disposed between one terminal and the other terminal, and
a magnetic material core spirally wrapped with said conductive line.

* * * * *